US010052820B2

(12) United States Patent
Kemmer et al.

(10) Patent No.: US 10,052,820 B2
(45) Date of Patent: Aug. 21, 2018

(54) ADDITIVE MANUFACTURING OF EXTENDED STRUCTURES

(71) Applicant: Made In Space, Inc., Moffett Field, CA (US)

(72) Inventors: Aaron Kemmer, Mountain View, CA (US); Michael Snyder, Mountain View, CA (US); Michael Chen, Mountain View, CA (US); Jason Dunn, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 399 days.

(21) Appl. No.: 14/485,240

(22) Filed: Sep. 12, 2014

(65) Prior Publication Data

US 2015/0076732 A1 Mar. 19, 2015

Related U.S. Application Data

(60) Provisional application No. 61/893,286, filed on Oct. 21, 2013, provisional application No. 61/877,542, filed on Sep. 13, 2013.

(51) Int. Cl.
*B29C 67/00* (2017.01)
*B29K 101/12* (2006.01)

(52) U.S. Cl.
CPC ...... *B29C 67/0055* (2013.01); *B29K 2101/12* (2013.01)

(58) Field of Classification Search
CPC ............ B29C 67/0055; B29C 67/0051; B29C 67/0059
See application file for complete search history.

(56) References Cited

U.S. PATENT DOCUMENTS

| 6,575,548 | B1 | 6/2003 | Corrigan et al. |
| 7,168,935 | B1 * | 1/2007 | Taminger ........... B23K 15/0073 219/121.12 |
| 2001/0030383 | A1 | 10/2001 | Swanson et al. |
| 2003/0235635 | A1 | 12/2003 | Fong et al. |
| 2004/0035542 | A1 | 2/2004 | Ederer et al. |
| 2005/0194401 | A1 | 9/2005 | Khoshnevis |
| 2008/0150192 | A1 | 6/2008 | Perret et al. |
| 2009/0208577 | A1 | 8/2009 | Xu et al. |
| 2009/0267269 | A1 | 10/2009 | Lim et al. |

(Continued)

FOREIGN PATENT DOCUMENTS

JP 2009013395 1/2009

*Primary Examiner* — Alison L Hindenlang
*Assistant Examiner* — Jamel M Nelson
(74) *Attorney, Agent, or Firm* — Terry M. Sanks, Esq.; Beusse Wolter Sanks & Maire, PLLC

(57) ABSTRACT

An extended structure additive manufacturing device and method are provided. The device includes a movable material bonding component and a movement mechanism which enable the device to create parts outside the conventional additive manufacturing device print volumes defined by the device and its print-head. Methods of making parts involve creating a portion of a part and moving the extended structure additive manufacturing device relative to the part and printing a second portion of the part. Parts incapable of being formed using a conventional additive manufacturing device may be made using the extended structure additive manufacturing device and/or methods disclosed herein.

27 Claims, 24 Drawing Sheets

(56) References Cited

U.S. PATENT DOCUMENTS

2013/0209600 A1    8/2013   Tow
2014/0048981 A1*   2/2014   Crump ................ B29C 67/0066
                                                                264/401

* cited by examiner

ADDITIVE MANUFACTURING OF EXTENDED STRUCTURES

CROSS REFERENCE TO RELATED APPLICATIONS

This application claims the benefit of U.S. Provisional Patent Application No. 61/877,542, filed Sep. 13, 2013, and entitled "Extended Structure Additive Manufacturing Method" and claims the benefit of U.S. Provisional Patent Application No. 61/893,286, filed Oct. 21, 2013, and entitled "Additive Manufacturing Devices Configured For Various Environments," the entire contents of both being incorporated herein by reference.

FIELD OF THE DISCLOSURE

The present disclosure generally relates to manufacturing, and more particularly to additive manufacturing of large structures in various environments.

BACKGROUND

Additive manufacturing processes sequentially bond materials together in order to form the completed part. Creation of the part is computer controlled and produces the part according to three-dimensional representations of the desired part or other part creation instructions. Material, also known as "feedstock," may be bonded together via fusing layers or other small portions of material together.

Many current additive manufacturing techniques produce parts of limited size. The size of the part produced is constrained by the build volume of the additive manufacturing device. The build volume is the area in which the additive manufacturing device may create a part. A build volume is often defined in an XY plane by the area in which the additive manufacturing device may deposit or otherwise bond feedstock in forming the desired part. For example, in fused deposition modeling devices, the XY plane is defined by the lateral movement in the XY plane of the extruder which creates layers of the desired part. The initial layer is deposited onto a build platform or tray and subsequent layers are attached. The build volume is limited in the Z-direction by the maximum relative distance achievable between the build platform and the extruder or other bonding device. In some additive manufacturing devices, the build platform is connected to a z-axis step motor and moves as the part is created. In other devices, the extruder moves in the z-axis in addition to the x- and y-axes.

The size of the build volume is an inherent limitation of current additive manufacturing devices. Because this is a given volume, a continuous part can never grow larger than the build volume of a given machine. This poses a severely limiting problem where no object can be produced larger than the machine that is creating it. Today's additive manufacturing machines are growing print volume size in order to accommodate larger parts, but still there is an inevitable size limit on these machines. For instance, no additive manufacturing machine could be conceivably large enough to build an entire sky-scraper within its build volume; the machine would be far too large.

The size constraint placed on all additive manufacturing machines is a bottleneck. It severely limits the possible objects that could be built without any post machining to create the final part or structure.

Processes, such as those described in U.S. patent application Ser. No. 14/020,658 to Douglas, A., et al., have been created which produce large parts by dividing the desired part design into subparts which may be produced via additive manufacturing devices having limited build volumes. Connection features are added to each subpart design, enabling subparts to be connected together after production.

Given the foregoing, additive manufacturing devices which produce large, continuous parts without providing a build volume larger than the part itself are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which enable additive manufacturing of large continuous parts. Such parts or structures may be constructed without providing a build volume larger that the structure being produced. In various aspects, additive manufacturing devices in accordance with the present disclosure may function in environments such as space environments, microgravity environments, terrestrial environments, free fall environments, other controlled environments, and the like.

In an aspect, an extended structure additive manufacturing device is disclosed which includes a material bonding component such as an extruder, a body housing the material bonding component and a positioning system which positions the material bonding component and the part being created relative to one another. The positioning system may include two sub-systems: a part positioning system and a bonding component positioning system. The bonding component system may be a traverse system which positions the material bonding component within the body in an XY plane, enabling the material bonding component to create layers of the desired part. The bonding component positioning system may optionally include z-axis movement components, enabling multiple layers of the part to be created without utilization of the part positioning system. The part positioning system is configured to move the device relative to the part being created via rollers, claws, thrusters, or the like.

Devices in accordance with the present disclosure enable production of parts larger than any given build volume. With the extended structure additive manufacturing method, the device moves as it builds a three-dimensional part. As the device moves, the part being built extends beyond the device. The device can move by interfacing with worm gears, wheels, propulsion, or other known methods of traversing.

Devices in accordance with the present disclosure have many uses, including but not limited to building structures in outer space (e.g., large communications dishes), building extended beams or cross sections for construction of buildings on Earth, and building any large object that can't be built within a typical additive manufacturing device's limitations.

In some aspects, devices in accordance with the present disclosure may produce parts larger than the given build volume of a conventional additive manufacturing machine that lacks any of the movable engagement mechanisms as discussed herein that engage a portion of the part being printed and allow the part to extend away from the device In various aspects, devices may include one or more arms or other movable engagement mechanisms adapted or configured to engage with a portion of the printed material so that the material bonding component and the printed part move relative to one another during printing and/or one or more other such propulsion mechanisms that move the body or frame of the device relative to the printed material during printing.

In another aspect, an extended structure additive manufacturing device includes a movable material bonding component which prints a printed material to form a part, one or more arms, rollers, tracks, worms, or other such movable engagement mechanisms or propulsion mechanism that may be adapted or configured to engage with a portion of the printed part to provide relative movement between the device and the printed part and a body or frame that is open adjacent to the print-head so that the printed part extends away from the device during printing.

In another aspect, an extended structure additive manufacturing device includes thrusters configured to maneuver the device in space (e.g., around a large structure). The device further includes gripping arms which contact part as it is created, thereby enabling the device to move or travel over larger distances via thrusters and move finer distances via the movement of gripping arms. Part may be created via fine movement caused by gripping arms.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

Figure 1:
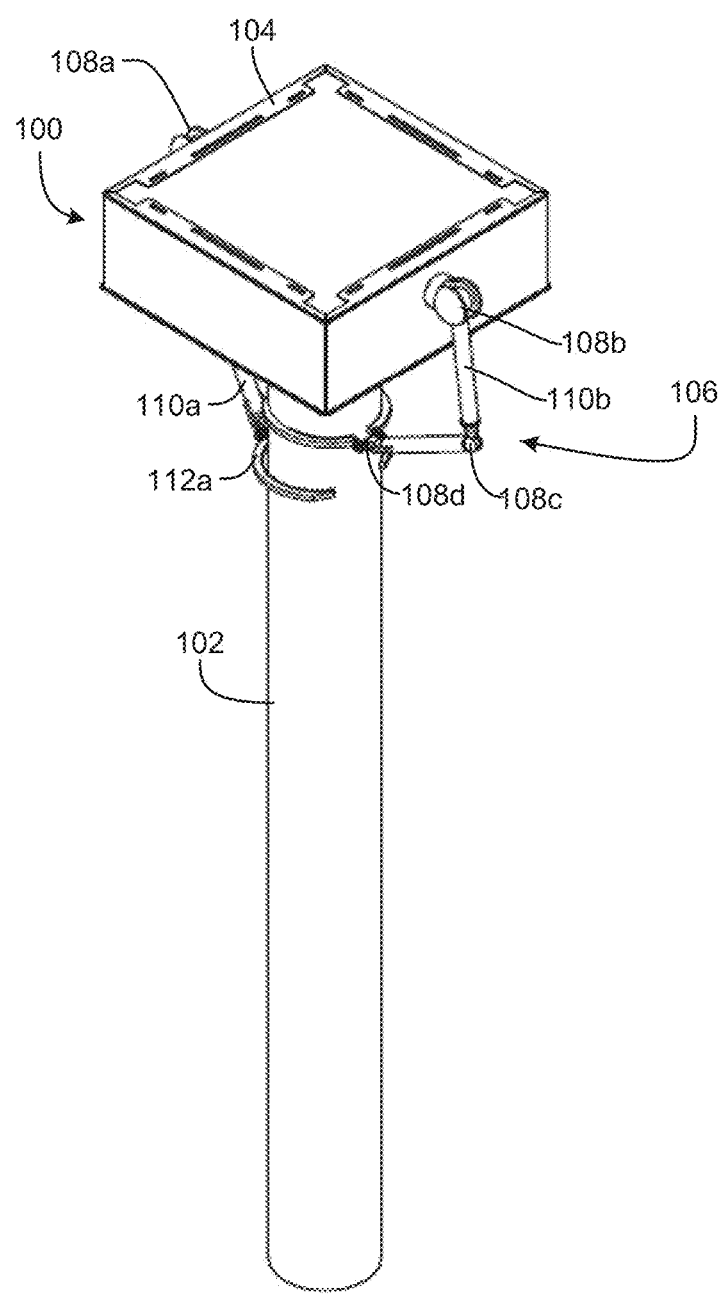
FIG. 1 is a perspective view of an extended structure additive manufacturing device producing an extended part, according to an aspect of the present disclosure.

The present disclosure is directed apparatus, systems, and methods which enable additive manufacturing of large continuous structures. Such structures may be constructed without providing a build volume larger than the structure being produced. In various aspects, devices in accordance with the present disclosure may function in environments such as outer space environments, microgravity environments, terrestrial environments, free fall environments, nautical environments, variable force environments, other controlled environments, and the like. Devices in accordance with the present disclosure may create desired parts as objects, structures, expendable parts, replacement parts, experimental objects, make-shift repairs, portions of any of the foregoing, and the like. Instructions for the production of such parts may be pre-programmed within the device, provided by a local computing device (e.g., a computing device on a space station containing the additive manufacturing device), transmitted from a remote location (e.g., received from a remote server, received from a computing device on another celestial body or spacecraft), or received or generated at another location apparent to those skilled in the relevant art(s) after reading the description herein.

Extended structure additive manufacturing devices and the associated methods disclosed herein have many applications for building large structures, parts, and objects. It can be used to build any object greater than a typical machine's build volume. Such applications include, but are not limited to creating: beams for the construction of buildings; infrastructure of large skyscrapers; large antenna and communication devices; generative designed structures created specifically for their intended use; large structures in outer space; conduit and piping for building construction, including pipes with 90° turns; fuselages or portions thereof (e.g., aircraft fuselages); vehicle chassis and frame; portions of ships, submarines and the like; pressure vessels; and other large and small objects.

When creating a structure in outer space, several challenges and opportunities arise. In general, creating a structure in outer space is preferable to building that structure on earth and transporting it to outer space for final assembly. By creating the structure in outer space (hereinafter "space"), that structure is not subject to the stresses of gravity, the vibration and additional acceleration forces from launch, and therefore it requires far less mass and overbuilding. The part may weigh far less and take up far less payload volume as a result.

Large-scale parts cannot be achieved simply by transporting the equivalent of a modern additive fabrication machine into space due to the "build volume" constraints. Devices in accordance with the present disclosure may be used to build large parts, continuous structures and other objects in space. Examples of potential space-based applications include building: large structures; mega structures; space stations; space-based solar power infrastructure; satellite components; docking stations; fuel depots; asteroid mining infrastructure; spacecraft (manned or unmanned); planetary body development infrastructure; generative designed structures; created specifically for their intended use; larger than deployable stiff beams and trusses; or portions of any of the foregoing.

Devices in accordance with the present disclosure enable production of continuous parts larger than any given build volume. With the extended structure additive manufacturing method, either the device or the part being created moves as it builds a three-dimensional part. During creation, the part being built extends beyond the build area. The device can move by interfacing with worm gears, wheels, propulsion, or other known methods of traversing.

Various devices in accordance with the present disclosure may function in a pressurized environment (e.g., within a spacecraft), in a space environment, on a celestial body, while being exposed solar radiation, large thermal extremes and gradients, atomic oxygen and the like.

Figure 2:
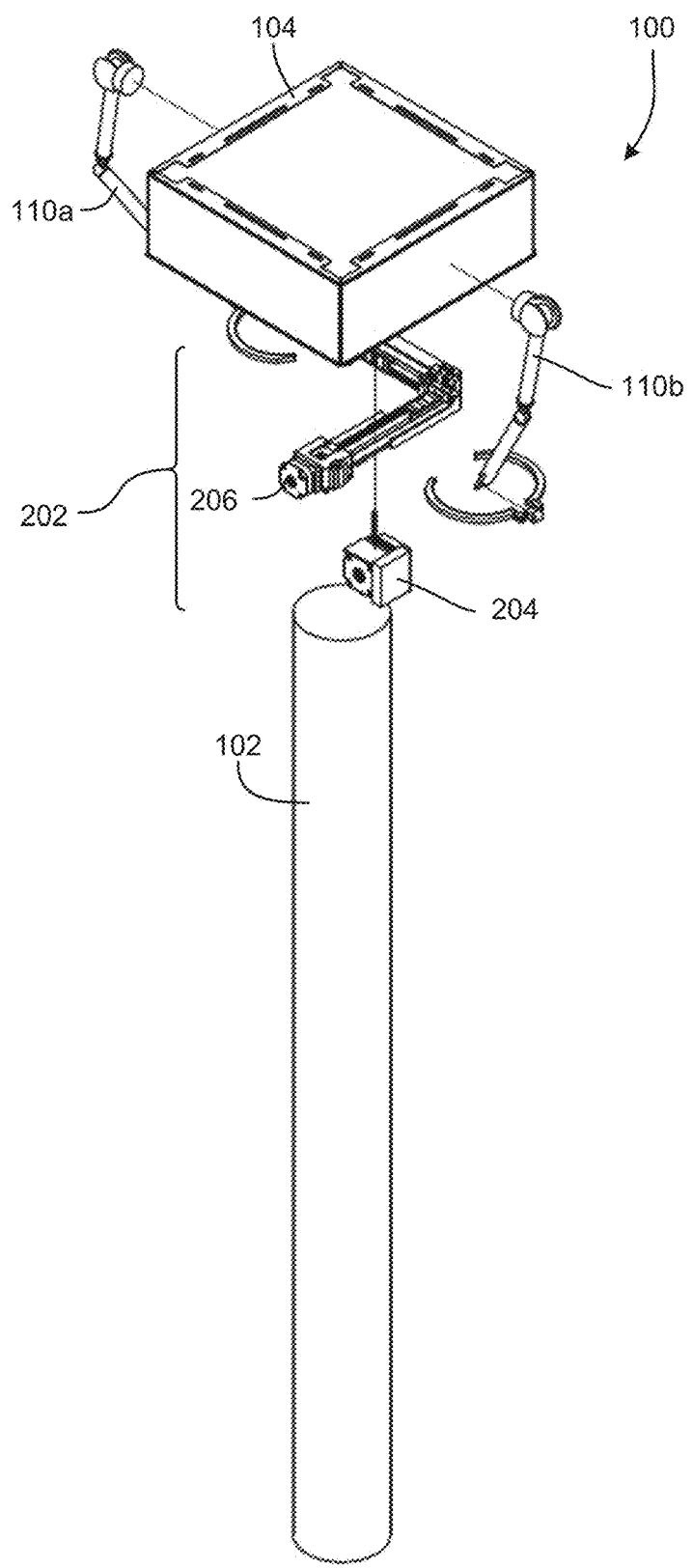
FIG. 2 is an exploded perspective view of an extended structure additive manufacturing device producing an extended part, according to an aspect of the present disclosure.
Figure 3:
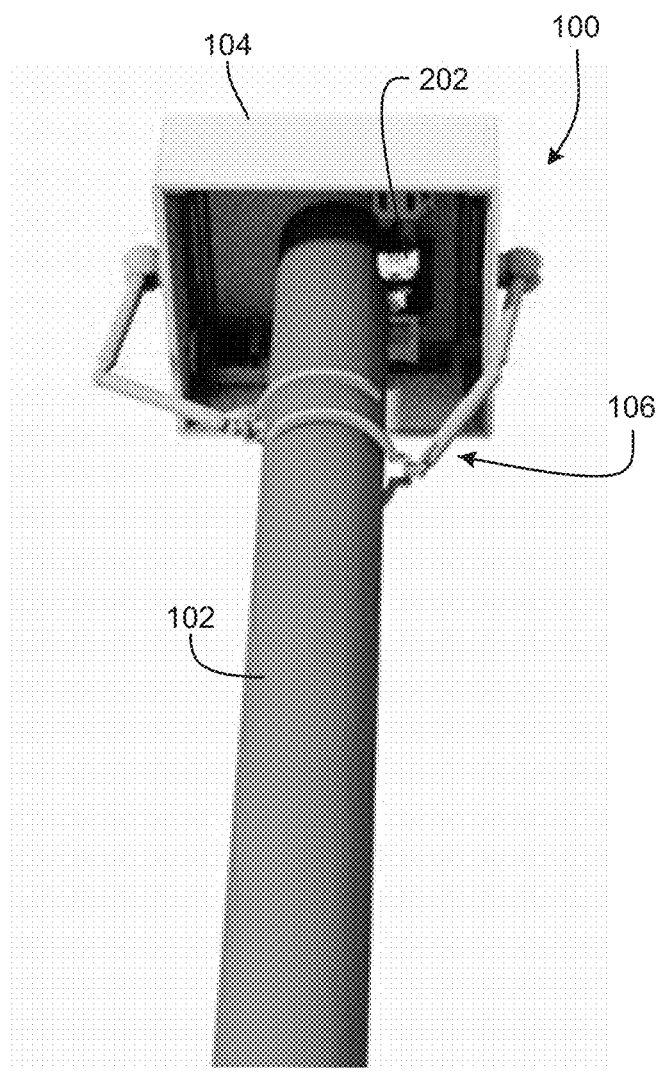
FIG. 3 is a bottom perspective view of an extended structure additive manufacturing device producing an extended part and showing the material bonding system, according to an aspect of the present disclosure.

Referring now to FIGS. 1-3, various views of an extended structure additive manufacturing device 100 which is producing a part 102, according to various aspects of the present disclosure, are shown.

The term "part" may be used herein to refer to objects created in whole or in part by extended structure additive manufacturing devices disclosed herein. Such objects may be continuous structures which extend away from the material bonding component as they are created. Example structures, such as beams or supports, may be generally linear in profile. Other structures, such as a pressure vessel, communications array, conduit, or portions of a spacecraft may have more complex or irregular profiles.

Extended structure additive manufacturing device 100 may have a body and/or a frame 104, material bonding system 202, and a movement mechanism 106 configured to move the additive manufacturing device relative to the part during part creation. Material bonding system 202 may include a movable material bonding component 204 connected to a material bonding component positioning system 202 such as the traverse shown in FIG. 2. Positioning system 206 moves material bonding component 204 within device 100. In various aspects, material bonding system 202 includes multiple material bonding components 204 moveable via one or more positioning systems or via portions of movement mechanism.

In an aspect, positioning system 206 is a traverse system. Traverse system 206 physically interfaces with and is supported by frame 104. The traverse system may include multiple linear actuators oriented in one or more axes. Each linear actuator includes a stepper motor connected to a gear box which rotates a screw-driven linear rail. A carriage is connected for movement to the rail, enabling precise positioning of the carriage and attached components such as other linear actuators and material bonding component 204.

In some aspects, positioning system 206 is omitted and movement mechanism 106 positions material bonding component 204.

Frame 104 may be a single piece such as a casting or molding, or frame 104 may be formed of multiple pieces. Frame 104 may include multiple portions housing modular and/or interchangeable components (e.g., control electronics modules, feedstock modules, and the like). In some aspects, frame 104 is a monocoque structure.

Material bonding system 202 may be part of an additive manufacturing device that has stationary parts secured to or part of the frame 104 as well as one or more movable parts used to print materials such as material bonding component 204, so that material bonding component 204 may move relative to frame 104. Material bonding component 204 may be an extruder which melts received feedstock, such as a polymer filament, and places, via positioning system 206 and movement mechanism 106, melted filament in order to create the desired part. Material bonding component 204 may comprise a selective laser sintering (SLS) mechanism or direct metal laser sintering mechanism (for which the movable portion may be part of a scanner system that is part of device 100). In some aspects, material bonding component 204 may be a welding device such as an electric arc welder, an energy beam welder, an oxy-fuel or gas welder, a resistance welder, or a solid state welder. In other aspects, the material bonding component 204 may be a stereolithography device, an inkjet head, a cladding head, a concrete or other solidifying material deposition device, or any other device apparent to those skilled in the relevant art(s) after reading the description herein. Where multiple material bonding components 204 are utilized, such multiple material bonding components 204 may bond or otherwise deposit different materials or have different characteristics (e.g., different resolutions).

A conventional printer has a print volume that is defined by the range of movement of the print-head. Device 100 enables continuous part creation outside of the print volume defined by the printer, thereby providing an expanded area available for creating part 102 that is not found in conventional additive manufacturing machines.

During part 102 creation, device 100 moves relative to part 102 and vice versa via movement mechanism 106. Movement mechanism 106 may be any one or more of various propulsion mechanisms. One such propulsion mechanism is a movable engagement mechanism, such as one or more fixed or movable arms 110. Arms 110 may be rigid or articulated with one or more joints 108 such as hinges and/or ball-joints. Arm 110 may include gripping claws 112 or other portions which may interface and/or stabilize part 102. In other aspects, movement mechanism 106 may include rollers, movable tracks, worms, wheels (including cog wheels such as gears, pinions, and wheels with ball rollers), or directable thrusters (such as a small jet or rocket thruster). The drive for such movement mechanisms 106 may be mechanical and/or electrical (such as via motor and optional gearbox and/or cables and pulleys; rack and pinion) and/or hydraulic (such as via hydraulic fluids and pistons connected to movable portions). Movement mechanism 106 may be e.g., mechanical and/or chemical (as in a rocket).

Extended structure additive manufacturing device 100 may additively construct part 102 beneath it. When device 100 reaches the extent of the conventional "build volume" defined by material bonding system 202, however, device 100 actually "climbs" part 100 being constructed and/or moves the structure outside of the ESAMM's traditional "build volume." Therefore the ESAMM is able to create an additional, continuous, sequential portion of part 102, thereby generating part 102 substantially larger than device where desired.

As the printed portion of part 102 grows larger and/or longer, device 100 may climb or otherwise maneuver along part 102 at a necessary pace so that material bonding system 202 remains at the correct distance to part 102. In some aspects, material bonding component 204 is coupled or decoupled from the movement mechanism 106. Decoupling would enable device 100 to have variable levels of adjustment, allowing more accuracy to the bonding surface (e.g., the print surface) than movement mechanism 106 would otherwise allow. For example, where movement mechanism 106 allows for large steps (1 mm, 1 cm, 1 m, etc. depending on application) in a z-axis, material bonding system 202 may include traverse 206 which moves material bonding component 204 in the given z-axis in finer steps (10, 20, 100 microns, etc. depending on application). In this fashion, device 100 may create several layers of part 102 without repositioning part 102 via movement mechanism.

As a result, very complex structures could be created this way, irrespective of the limitations imposed by length, many more conventional fabrication technologies, or gravitational pull.

In an aspect, movement mechanism 106 may include arms 110 having robotic manipulators such as claws 112. Arms 110 may have up to 6 degrees of freedom with the help of electromechanical devices such as servo motors along each arm 110. In other aspects arms 110 may have more of fewer degrees of freedom. Arms 110 are used to position actuating gripping mechanisms (claw 112) to grab ahold of the created part 102 and robotically maneuver relative to part 102. The manipulators and arms 110 can range in size, quantity, and position to achieve the same type of climbing movement along a manufactured item as well as structures that already exist that need to be manufactured on.

In other aspects, arm 110 includes a gripping foot. The gripping foot may have an adhesive applied thereon, have a high friction contact surface, be deformable, include electrostatic adhesion elements, vacuum or other suction attachment elements, or the like in order to attach to part 102 in the desired manner.

In other aspects, arms 110 include devices which facilitate climbing part 102 in a similar fashion to recreational, Earth-based climbing. Devices include modules which tap into part 102 using an anchor for a hold while maneuvering, creating anchors along part 102 to use in place of post manufacturing anchor integration/use. Picks and other surface drilling devices can be used also to "bite" in a surface to allow maneuvering.

In various aspects, device 100 includes or is connected to one or more feedstock sources. Feedstock is any material or combination of materials suitable for the production of a part. Feedstock may be plastic, metal, organic material, inorganic materials or combinations of such materials. As will be apparent to those skilled in the relevant art(s) after reading the description herein, materials such as acrylonitrile butadiene styrene (ABS), polycarbonate (PC), polylactic acid (PLA), high density polyethylene (HDPE), polyphenylsulfone (PPSU), soldering wire, polymer matrix composites, polyether ether keytone (PEEK), bismuth, aluminum, titanium, tin, and the like may be used to produce desired parts via additive manufacturing. In some aspects, feedstock is in the appropriate state, shape, size, and/or other physical characteristic suitable for utilization by the material bonding component. Feedstock may be produced from asteroid regolith, regolith of other celestial bodies, from space debris, from trash, from obsolete parts, and the like. In some aspects, feedstock is a polymer filament containing metal powder. In another aspect, feedstock is a polymer containing carbon nanotubes, fibers, or the like. In yet another aspect, feedstock is a resin, a resin containing a filler, binder, and/or powder, or the like. Feedstock may be a liquid or a combination of materials having different physical states (e.g., a solid and a liquid).

In some aspects, device 100 includes control electronics mounted within or on to frame 104. Control electronics may operate portions of device 100 and/or receive operational commands from other sources via mechanisms apparent to those skilled in the relevant art(s) after reading the description herein.

Although part 102 shown in FIGS. 1-3 is a linear beam, device 100 may be utilized to produce parts 102 having non-linear profiles. For example, device 100 may produce a dish-shaped part 102 of any desired size (e.g., 10 meters, 100 meters, 1 or more kilometers). Device 100 may produce complex structures such as a lattice, a pressure vessel, a spacecraft module, and the like.

In some aspects, the print area may be angled relative to previously created layers of part 102. This is one manner of creating a curved portion of part 102. Device 100 may be oriented in this fashion and spiral inward, creating a dish or other circular structure. As will be apparent to those skilled in the relevant art(s) after reading the description herein, device may be oriented in other manners or create portions of part 102 in other ways in order to create the desired linear or non-linear structure of part 102.

Figure 4A:
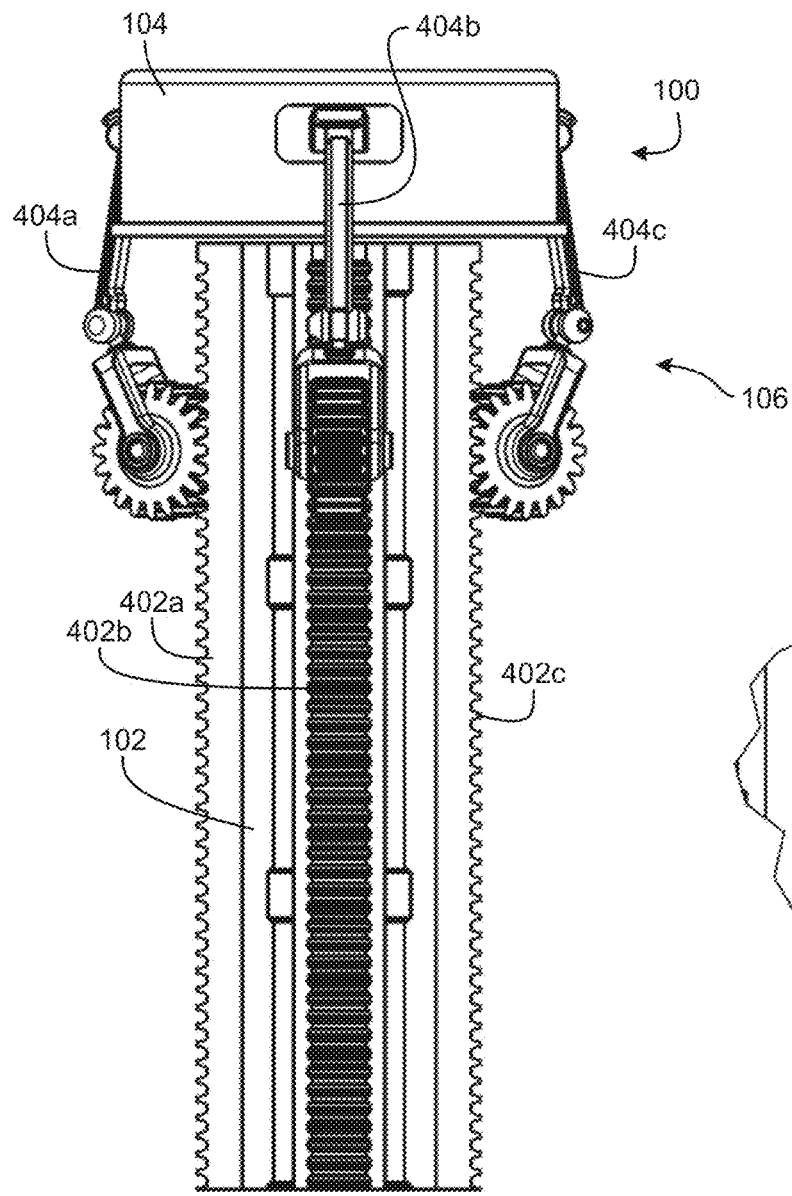
FIGS. 4A & B are views of an extended structure additive manufacturing device comprising geared wheels and producing a part having geared guide topography, according to an aspect of the present disclosure.
Figure 4B:
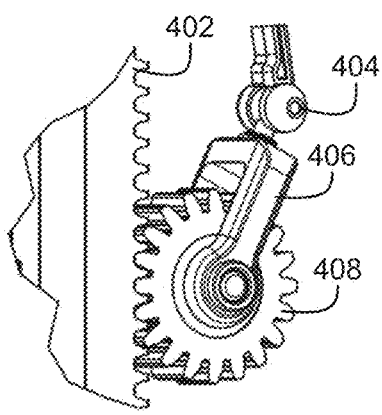
Figure 5:
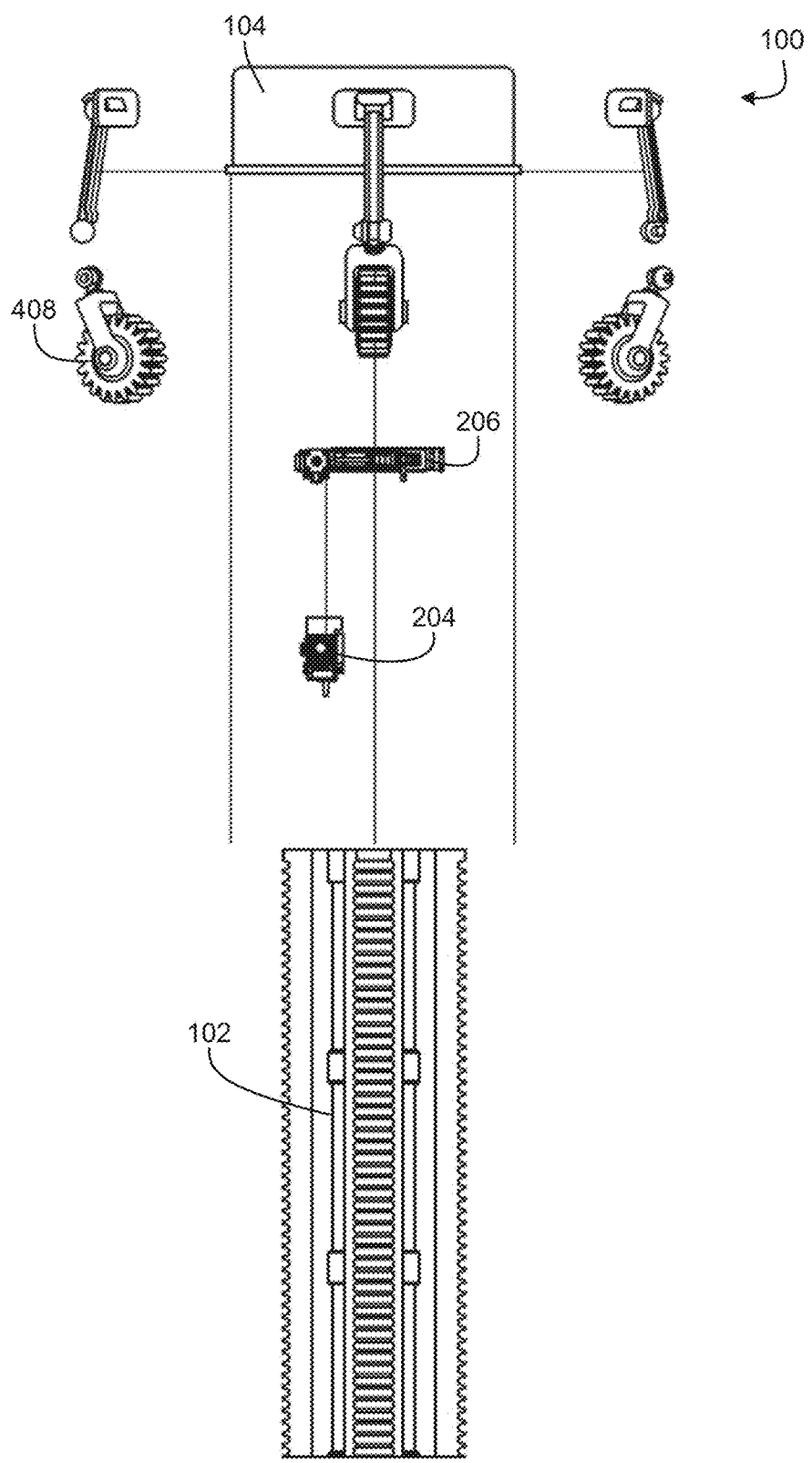
FIG. 5 is an exploded perspective view of an extended structure additive manufacturing device comprising geared wheels and producing an extended part having geared guide topography, according to an aspect of the present disclosure.
Figure 7:
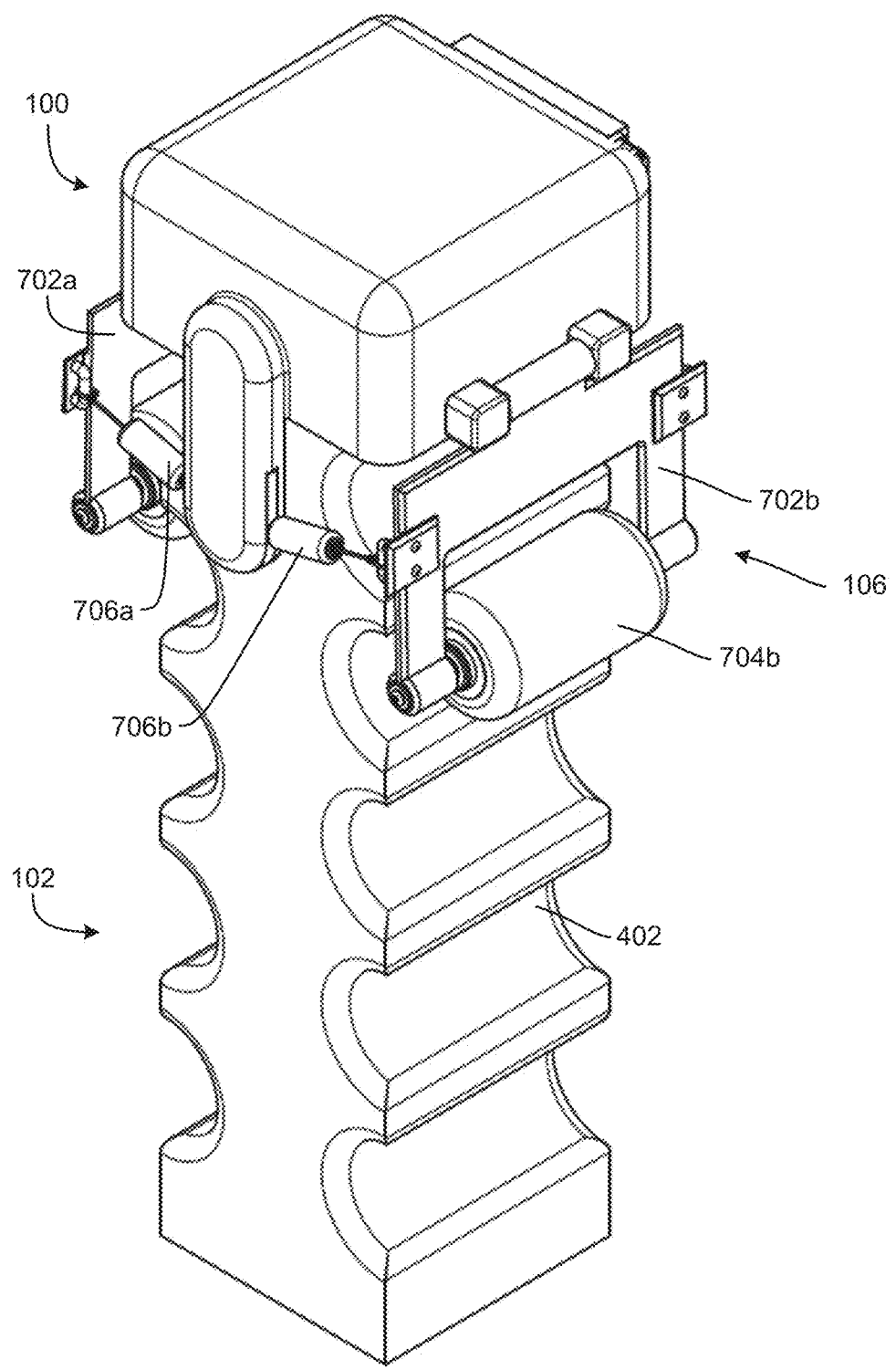
FIG. 7 is a perspective view of an extended structure additive manufacturing device comprising rollers and producing a part having guide topography, according to an aspect of the present disclosure.

Referring now to FIGS. 4A, 4B & 5, various views of extended structure additive manufacturing device 100 comprising geared wheel arms 404 having articulable wheels 408 held within axle 406, according to various aspects of the present disclosure, are shown. Wheel 408. In other aspects, device 100 includes additional portions of moving mechanism 106 which cause device to move relative to part 102. Device 100 may produce part 102 having guide topography 402, such as the columns of teeth shown in FIGS. 4A-B. Guide topography 402 is any structure created by device 100 which interfaces with movement mechanism 106 in order to assist in maintaining positioning between part 102 and device 100. Guide topography 402 may be integrated into part 102 or added to the desired design of part 102 before part production. Guide topography 402 may be continuous, as shown in FIGS. 4A-5, or created periodically. For example a recessed annulus may be integrated into the surface structure of part 102 at defined intervals, providing a place for movement mechanism to grip part 102 as it is produced. Guide topography 402 may be one or more columns of spur teeth (as shown in FIG. 4), worm teeth (as shown in FIG. 11), helical teeth, or the like. Guide topography 402 may be a series of indentations (as shown in FIG. 7) or a series of protrusions. Guide topography 402 may include a roughened surface or other features which increase frictional forces between movement mechanism and part 102. As will be apparent to those skilled in the relevant art(s) after reading the description herein, guide topography 402 may be any regular or irregular surface treatment which facilitates guiding and positioning part 102. In various aspects, no guide topography 402 is created.

Wheel 408 includes a toothed surface enabling interaction with a flat gear surface topography 402 or a rack surface topography 42. In other aspects, wheel 408 has a spur gear or helical gear surface, enabling interaction with surface topography 408 configured to create a spur gear or helical gear.

Gear wheel arms 404 may or may not be spaced evenly around frame 104. In some aspects, gear wheel arms 404 can have up to 6 degrees of freedom with the help of electromechanical devices such as servo motors along each arm 404. At the base of each arm 404 is a motor and spur gear wheel 408 that locks into the part at surface topography 402. While the vertical translation is controlled primarily by arms 404, an adjustment mechanism ensures that the material bonding component 204 stays within an ideal range. Control electronics may rest on top of device, but can be moved anywhere and/or housed within an enclosed structure, or could also be unenclosed.

Movement mechanism 106 configured as a multi-armed gear mechanism, which could have two, three, four, five six, or more arms, may provide three main benefits. First, by using gears and designing structures that incorporate teeth or without teeth and using another solution, a desired climbing rate is ensured (I to I, 2 to I, 3 to I, etc.). Second, the arms can move in and out easily to allow for a variety of diameters, even within the same structure. Finally, gearclimbing rates can be adjusted to create curved structures, allowing movement beyond 1-axis creations.

Figure 6:
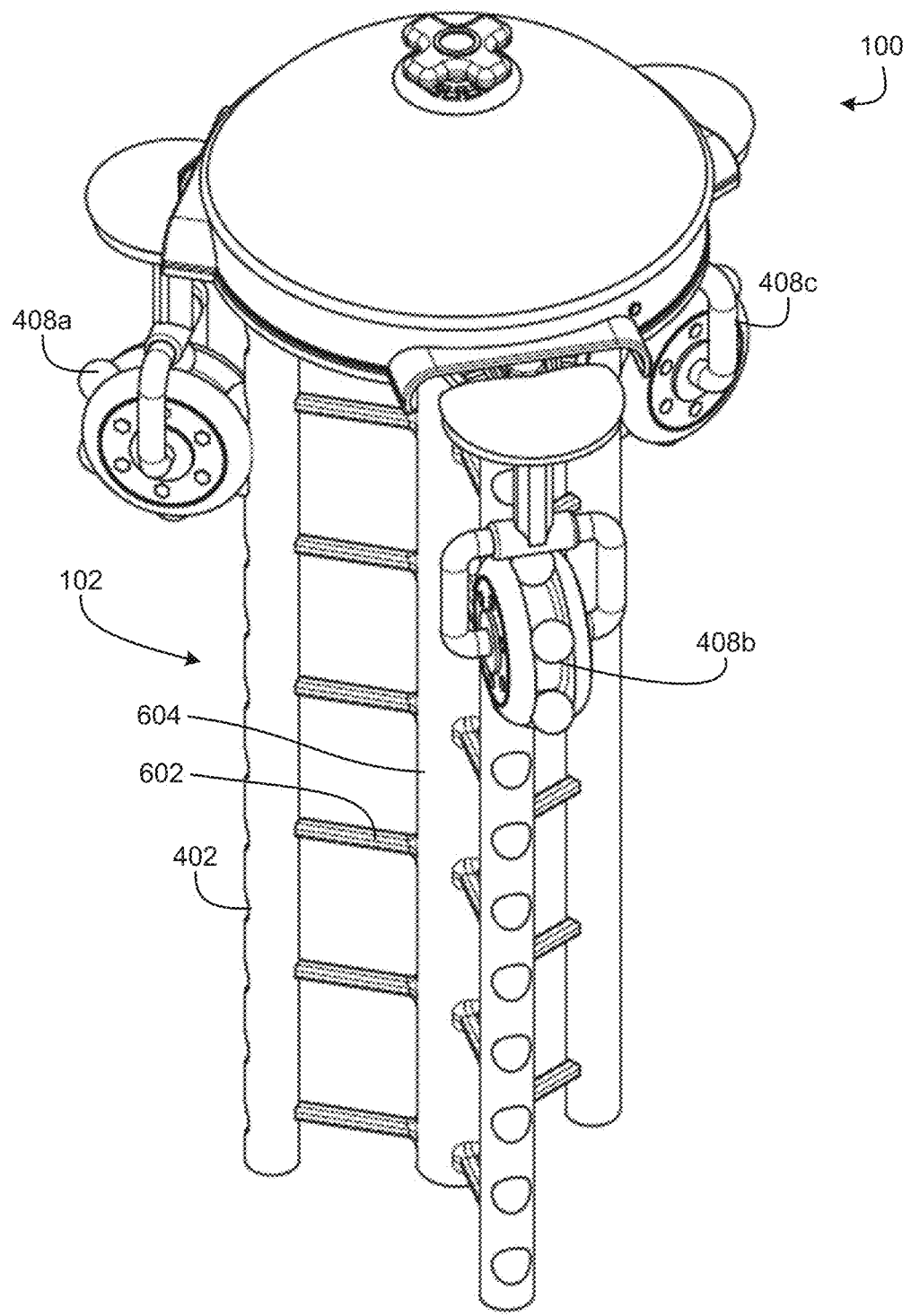
FIG. 6 is a perspective view of an extended structure additive manufacturing device comprising geared wheels with hemispherical teeth and producing a part having guide topography, according to an aspect of the present disclosure.

Referring briefly now to FIG. 6, extended structure additive manufacturing device 100 comprising geared wheels 408 with hemispherical teeth and producing part 102 having guide topography 402, according to an aspect of the present disclosure, is shown. Part 102 may be produced with outer guide portions housing guide topography 402. Such outer guide portions may be removable from the desired structure 604 via cross members 602. After creation of part 102, the outer guides and cross members 602 may be removed, leaving the desired portion 604 for utilization.

Figure 8:
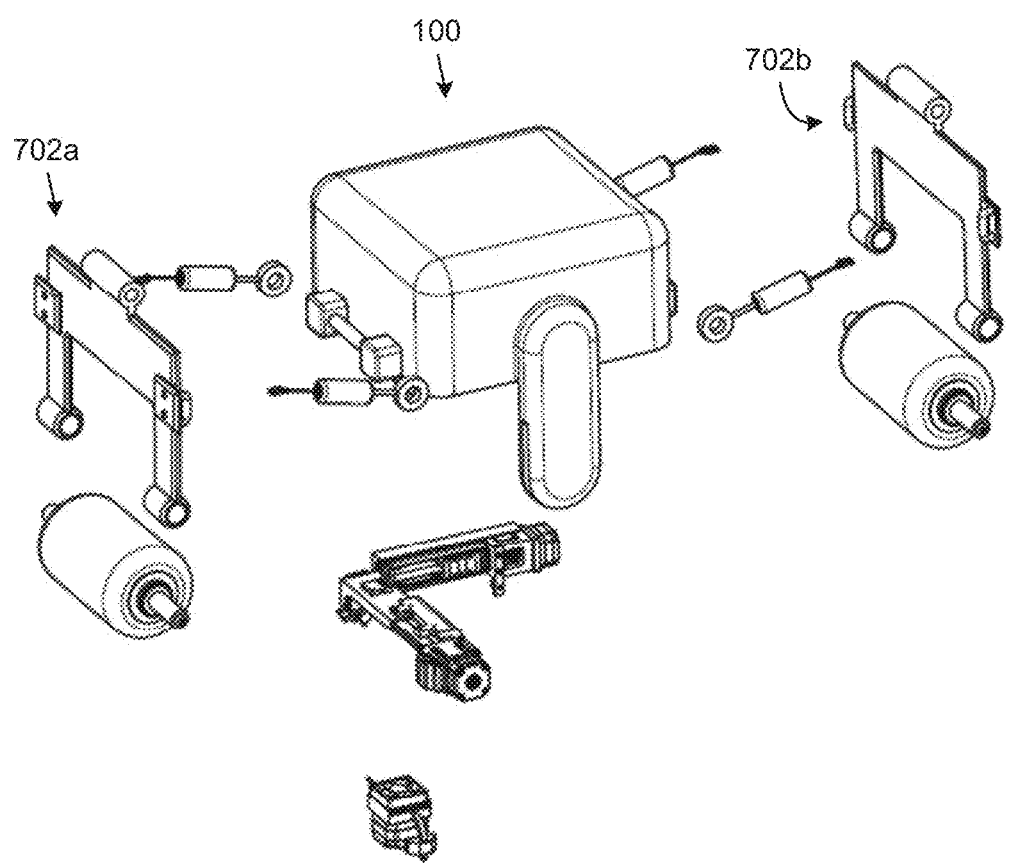
FIG. 8 is an exploded view an extended structure additive manufacturing device comprising rollers, according to an aspect of the present disclosure.

Referring now to FIGS. 7-8, various views of extended structure additive manufacturing device 100 comprising rollers and producing a part having guide topography In some aspects, moving mechanism 106 may include two of more roller arms 702. Each roller arm 702 includes a roller 704. In other aspects, roller arms 702 include rotating balls or other objects which may roll along a track containing indentations or along the smooth surface of part 102. Part 102 may include surface topography 402 which creates a series of indentations along a long axis of part 102. Roller arms 702 may be controlled by actuator 706, providing a variable force and allowing device 100 to accommodate parts 102 of varying cross sections. The force of roller arms 702 is variable to adjust for any sized contours without slipping. Rollers 704 can range in size, quantity (one, two, three or more), and position to achieve the same type of climbing movement along a manufactured part 102 and the materials used for the rolling mechanisms can range for any operational purposes (e.g. adhesive, high friction, soft).

Figure 9:
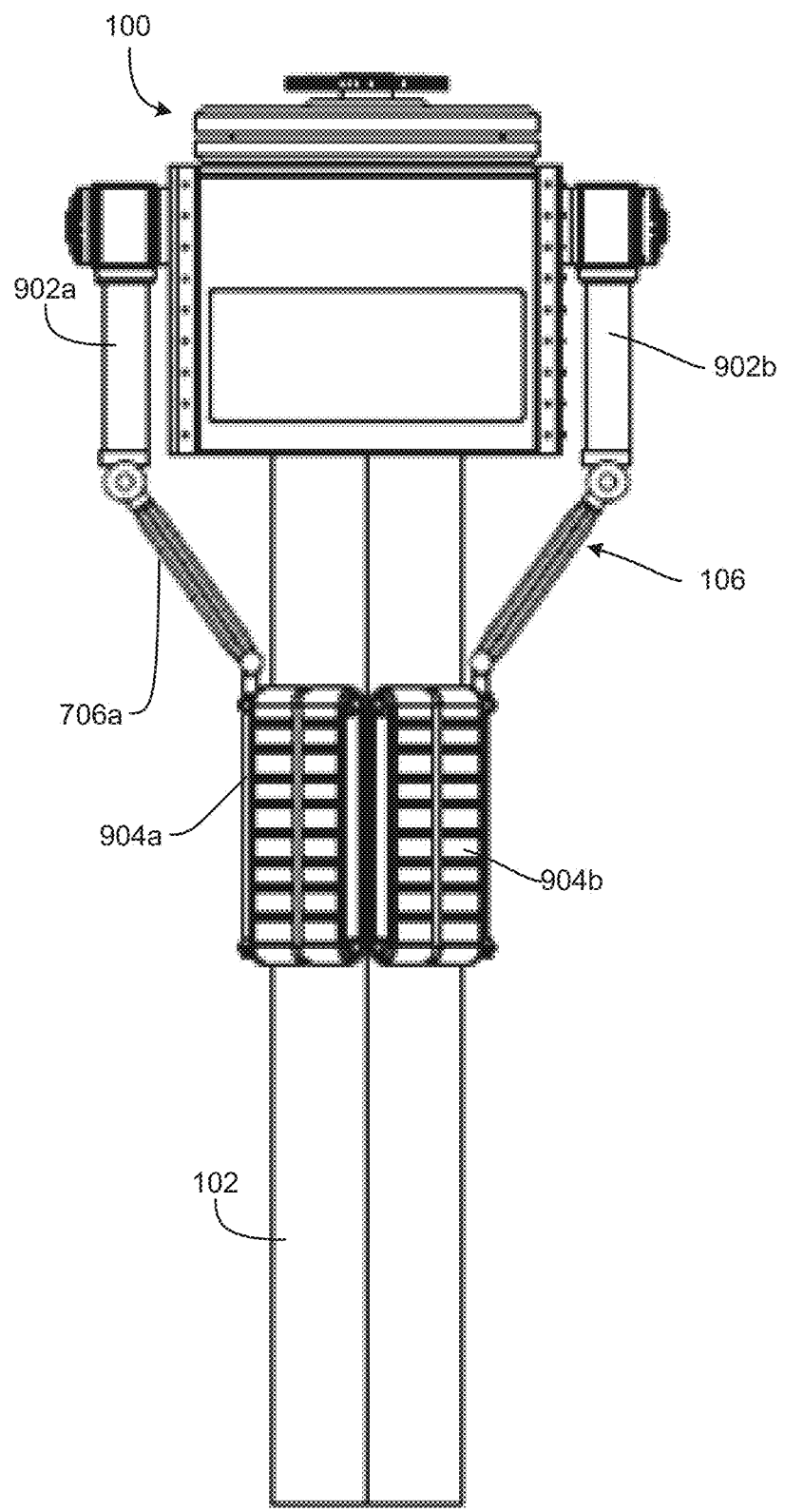
FIG. 9 is a side view of an extended structure additive manufacturing device comprising treads, according to an aspect of the present disclosure.
Figure 10:
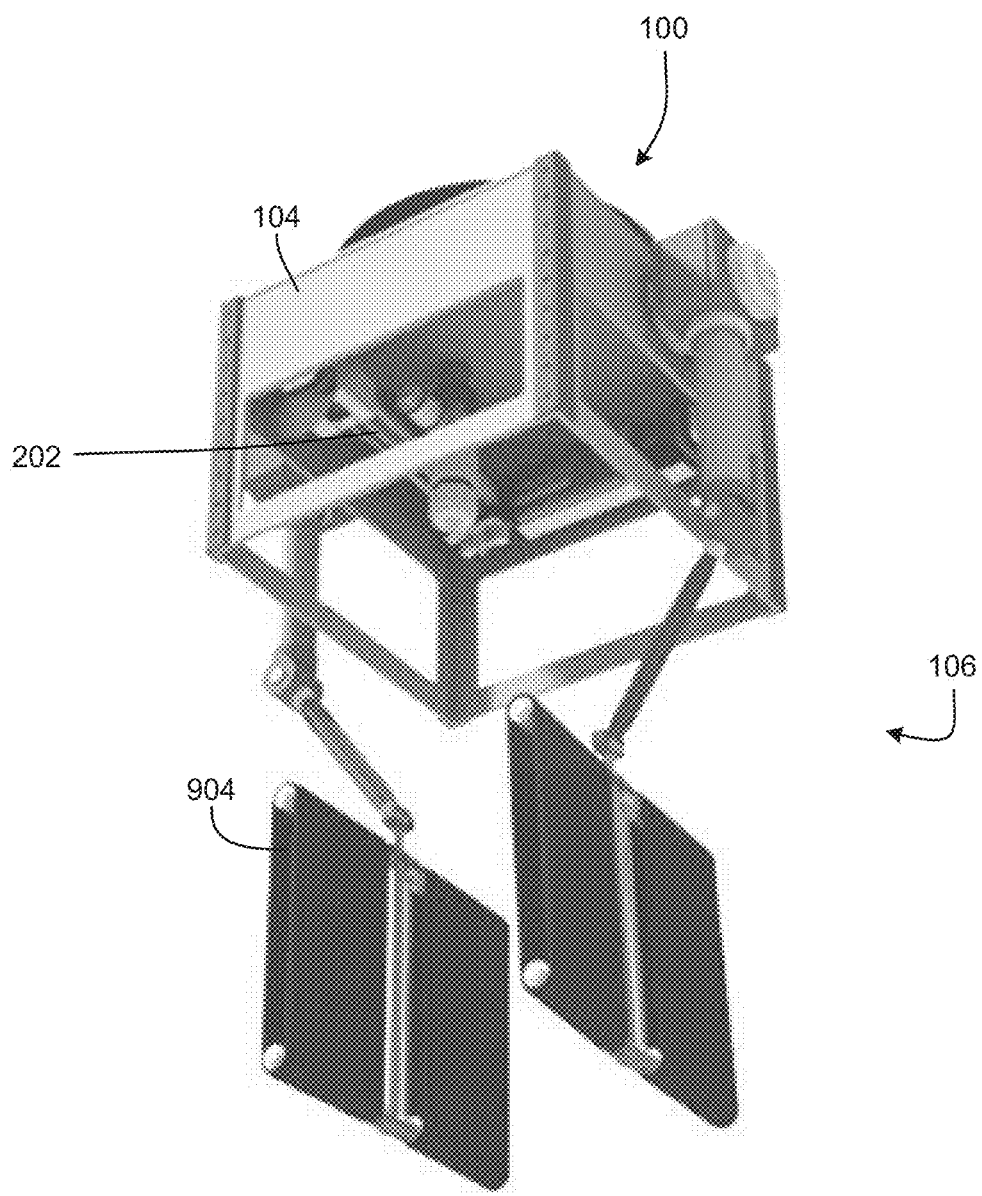
FIG. 10 is a bottom perspective view of an extended structure additive manufacturing device comprising treads, according to an aspect of the present disclosure.

Referring now to FIGS. 9-10, various views of extended structure additive manufacturing device 100 comprising treads arms 902, are shown.

Moving mechanism 106 may include tread arms 902. Each tread arm 902 may include two or more treads 904 which articulate, allowing treads 904 to contact sides of part 102. Treads 904 can swing in and out depending on the angle of contact with part 102. Like gear-based devices 102, devices including tread arms 902 have the ability to change diameters during a build, as well as from one part 102 to the next. Unlike the geared system, the structure does not have to be designed specifically to fit treads 904. As long as the treads can make consistent contact with the outer surface of part 102, positioning may be maintained.

Figures 11A, 11B:
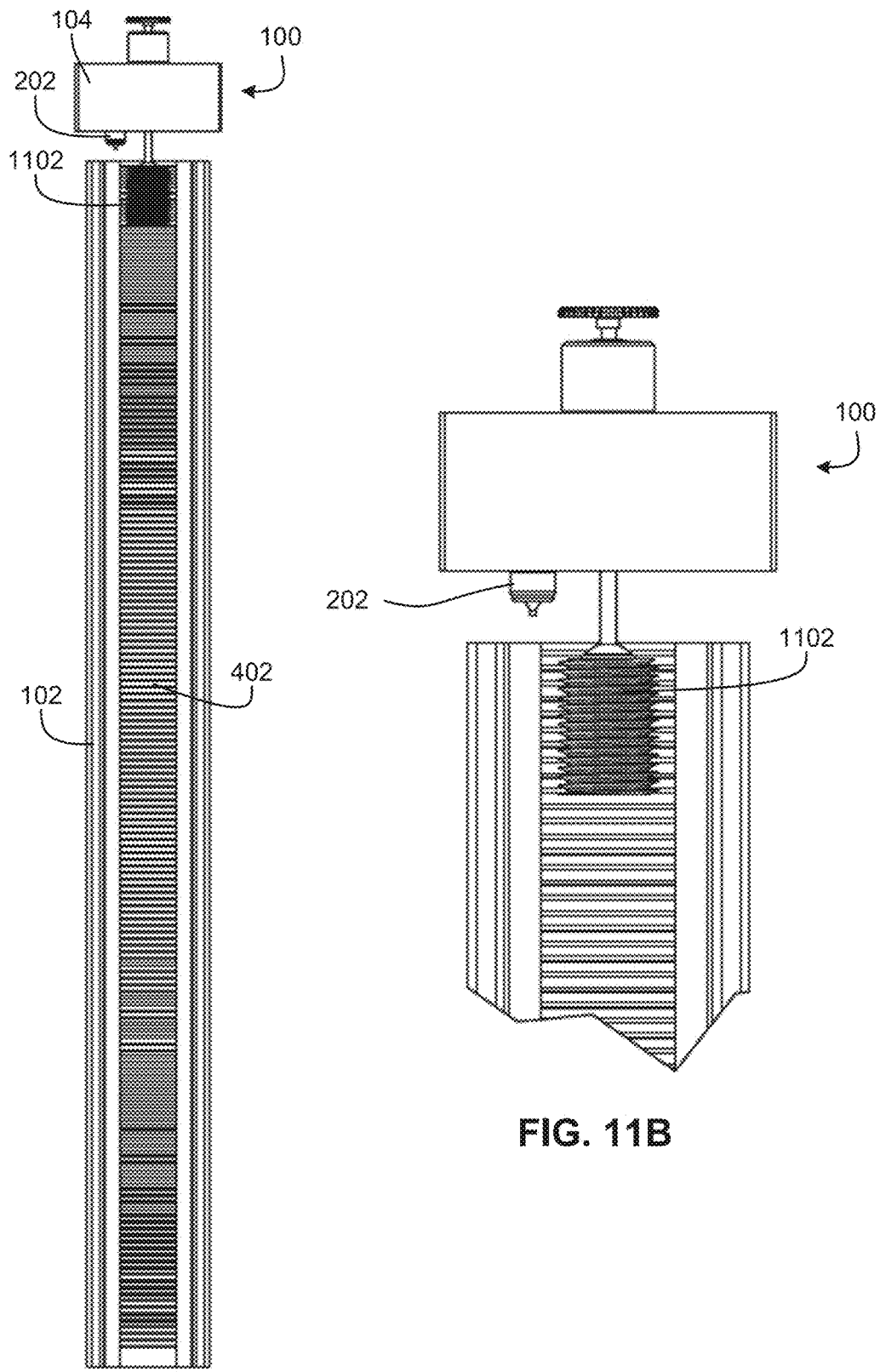
FIGS. 11A & B are views of an extended structure additive manufacturing device comprising worm gears and producing a part having guide topography, according to an aspect of the present disclosure.

Referring now to FIGS. 11A-B, views of extended structure additive manufacturing device 100 comprising worm gears 1102 and producing part 102 having guide topography 402, according to an aspect of the present disclosure, are shown.

In an aspect, device 100 may include two, three, four or more mobile or immobile worm gear arms 1102 each including a motorized worm gear. This gear will thread into the teeth of guide topography of part 102 during part creation.

Figure 12:
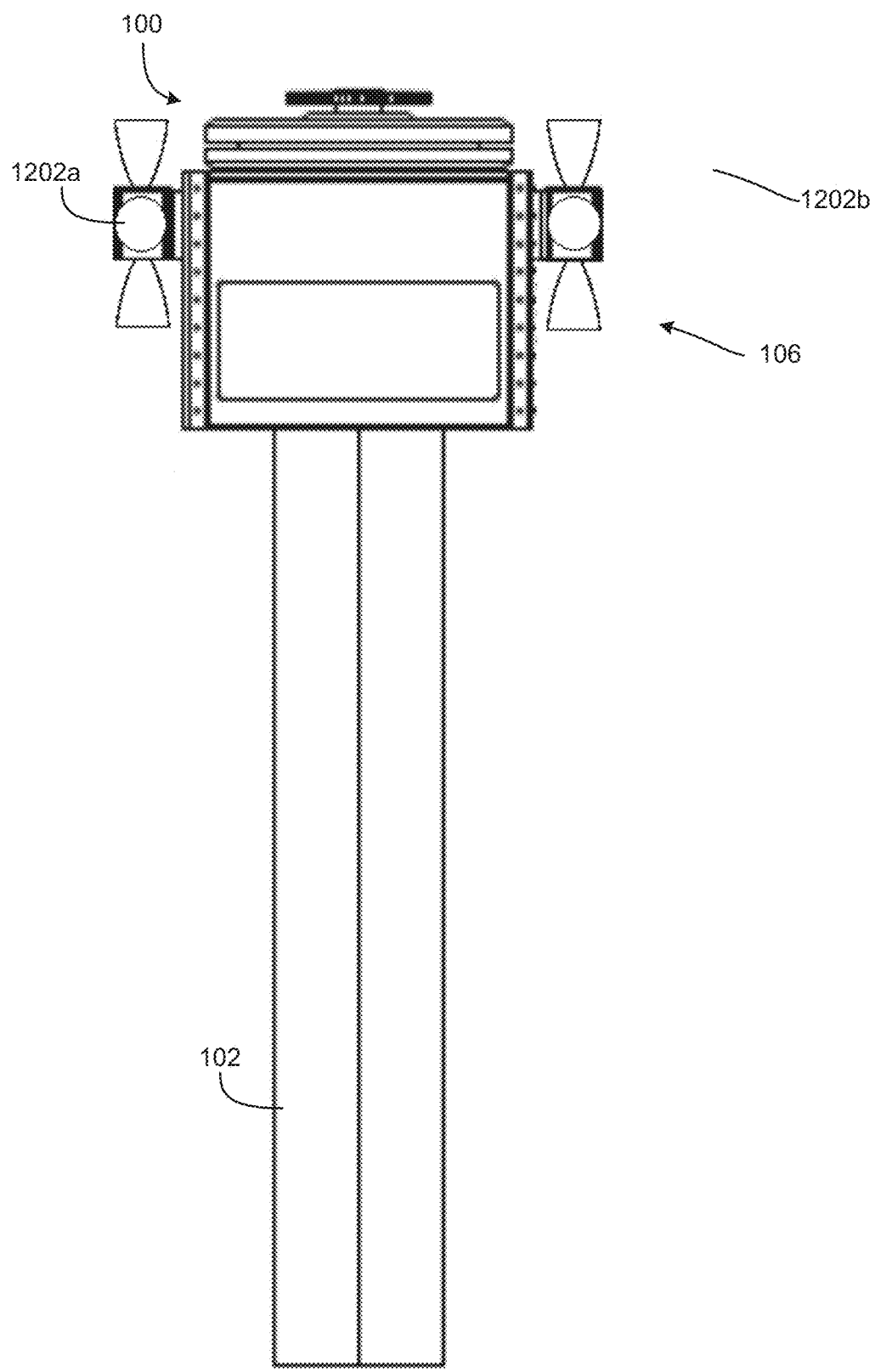
FIG. 12 is a side view of an extended structure additive manufacturing device comprising thrusters, according to an aspect of the present disclosure.

Referring now to FIG. 12, a side view of extended structure additive manufacturing device 100 comprising thrusters 1202, according to an aspect of the present disclosure, is shown.

In some aspects thrusters 1202 such as RCS thrusters or similar devices or thruster pods may be integrated into device 100 in lieu of or in addition to other portions of movement mechanism 106. Such a configuration allows device 100 to move along the part 102 being created without any direct contact.

Figure 13:
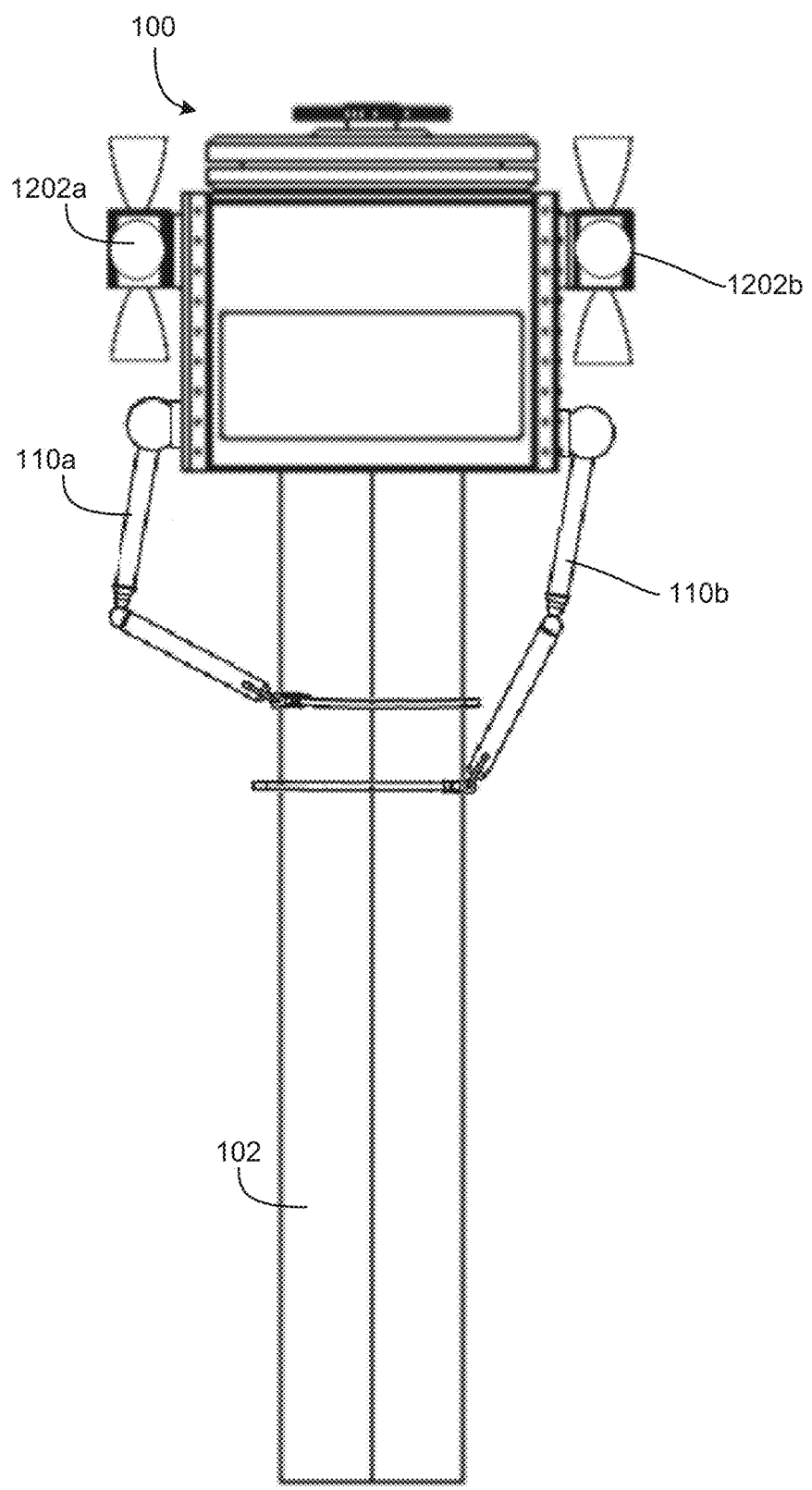
FIG. 13 is a side view of an extended structure additive manufacturing device comprising thrusters and grappling arms, according to an aspect of the present disclosure.

Referring now to FIG. 13, a side view of extended structure additive manufacturing device 100 comprising thrusters 1202 and grappling arms 110, according to an aspect of the present disclosure, is shown.

In various aspects, movement mechanism 106 includes fine movement control devices and gross movement control devices. Thruster 1202 may be an example of a gross movement control device, capable of moving device 100 large distances and not capable of precisely and quickly positioning device 100 over smaller distances. Thruster 1202 may also move device 100 from one area to another. For example, device 100 may produce a 100 meter long truss and transit, via thruster 1202 or similar propulsive device to a midpoint of the truss and begin creating a second truss connected and orthogonal to the first truss, thereby forming a more complex part 102. Fine movement devices include arm 110, roller arm 702, tread arm 902, gear arm 404 and the like. Fine movement devices grab onto or otherwise contact part 102 and stabilize device 100 relative part 102. Via such fine movement control devices, device 100 may travel "up" part 102 as it is creates. Some fine movement control devices may be used to move or traverse device 100 along part 102.

Figure 14:
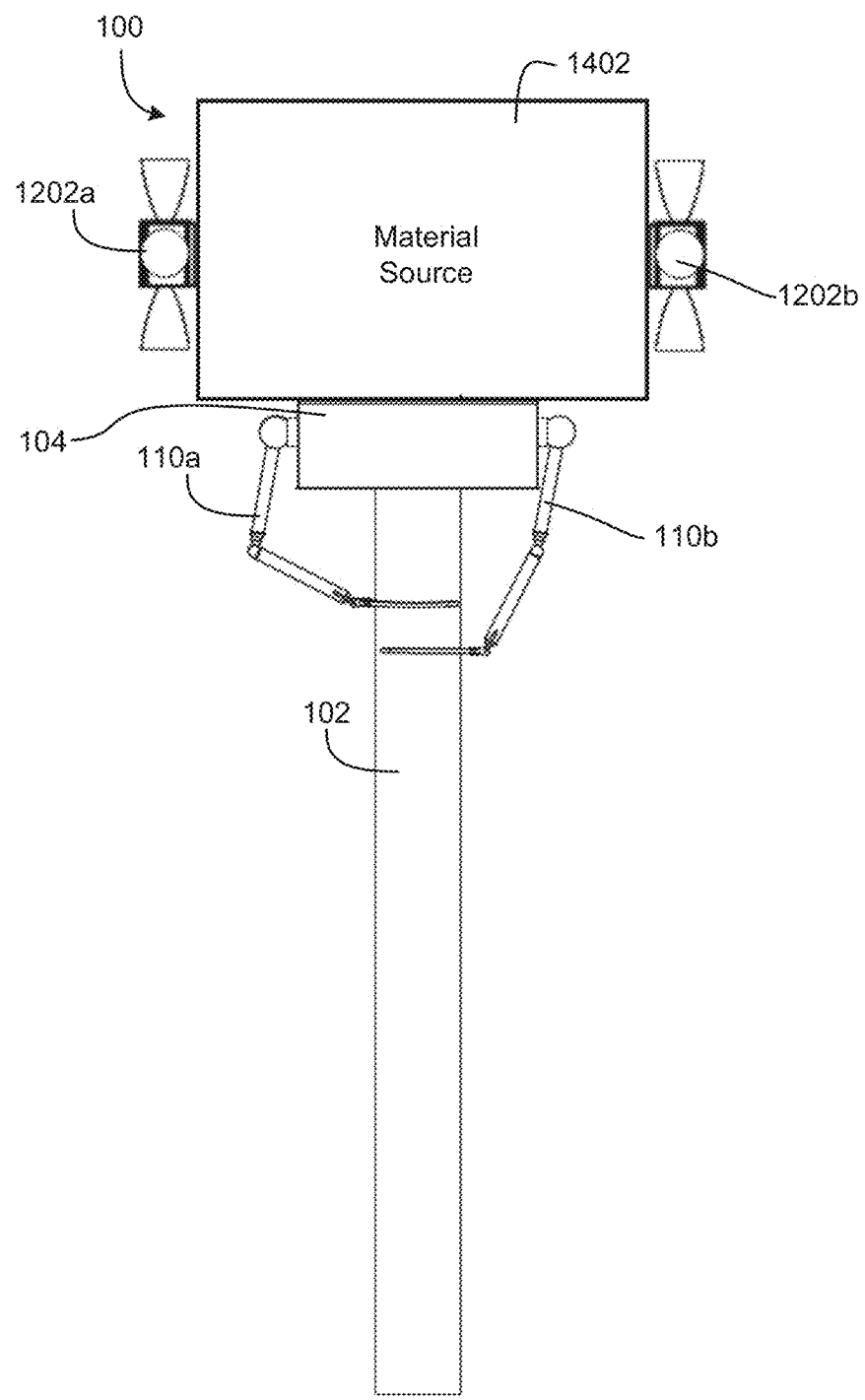
FIG. 14 is a side view of an extended structure additive manufacturing device comprising thrusters and grappling arms and depicting an exemplary material source, according to an aspect of the present disclosure.

Referring briefly now to FIG. 14, a side view of extended structure additive manufacturing device 100 comprising thrusters 1202, grappling arms 110 and a representative material or feedstock source 1402, according to an aspect of the present disclosure, is shown. Material source 1402 houses and/or produces feedstock. In some aspects, material source 1402 is integrated into device 100. In other aspects, material source 1402 is detachable, replaceable or refillable. In yet other aspects, material source 1402 is another device, vehicle, or body.

Figure 15:
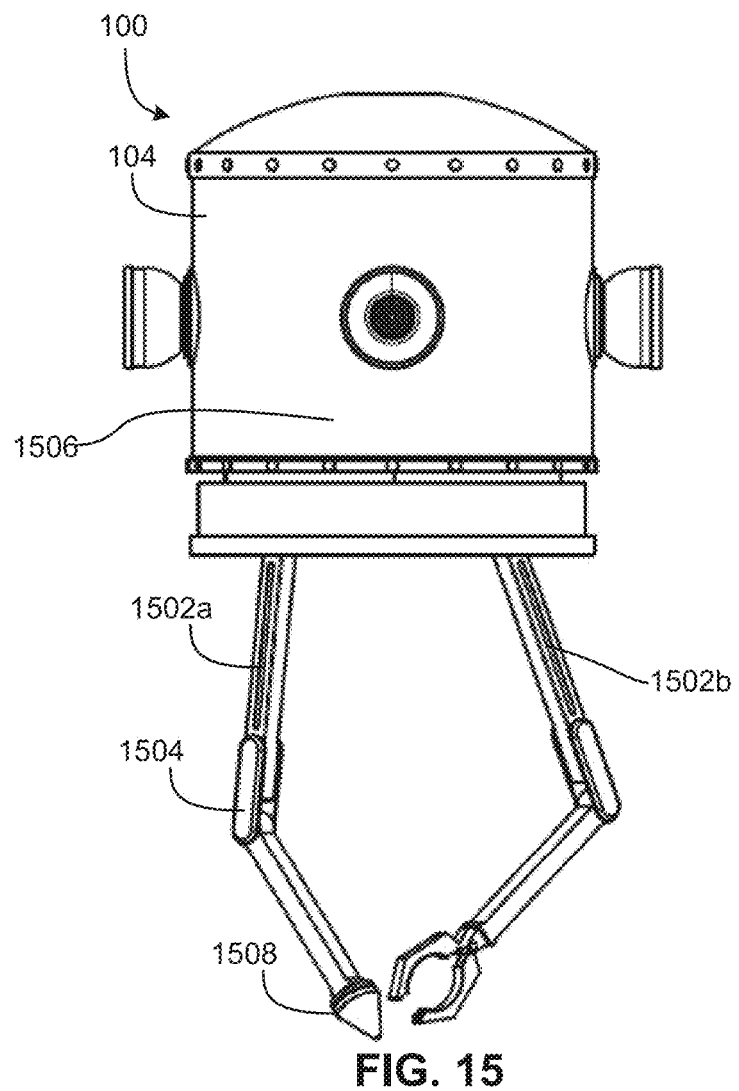
FIG. 15 is a perspective view of an extended structure additive manufacturing device having arms with fine and gross control elements, according to an aspect of the present disclosure.

Referring now to FIG. 15, a perspective view of extended structure additive manufacturing device 100 having arms 1502 with fine control elements and gross control elements, according to an aspect of the present disclosure, is shown.

In an aspect, movement mechanism 106 includes one or more combination arms 1502. Each combination arm 1502 has fine motors 1504 or other mechanisms or assemblies which allows small-scale movement (1 cm step size or less) of device 100. Each combination arm also include gross motors (positioned within frame 104 in FIG. 15) or other mechanisms or assemblies which allow large-scale movement (e.g., 10 cm step size or more). Fine motor 1504 is a fine movement control devices. Gross motor is a gross movement control devices. Gross motor 1506 and/or other gross movement control devices may be high torque devices, capable of joining objects together or imparting significant force on an object or objects. Gross motor 1506 may also be used to push device 100 off a surface, providing propulsion.

In some aspects, device 100 may include additional additive manufacturing devices or portions thereof mounted on an arm 1502. For example, an arm-mounted extruder 1508 may be positioned on an end portion of arm 1502, thereby allowing structures or portions of structures to be created with extruder 1508. In some aspects, an entire additive manufacturing device may be mounted on the end of arm 1502 or, more generally, a portion of movement mechanism 106. In other aspects, only deposition or bonding portions of the additive manufacturing device are mounted on the end of arm 1502. In such cases, the deposition or bonding portion is operatively connected to a feedstock source and other portions necessary for the creation of structures. Arms 1502 may contain channels, pathways or other structures which connect extruder 1508, a print head or the like to a feedstock source housed within or connected to device 100. As will be apparent to those skilled in the relevant art(s) after reading the description herein, other constructing, repairing, inspection, and/or observation devices may be mounted on arms 1502.

Figure 16:
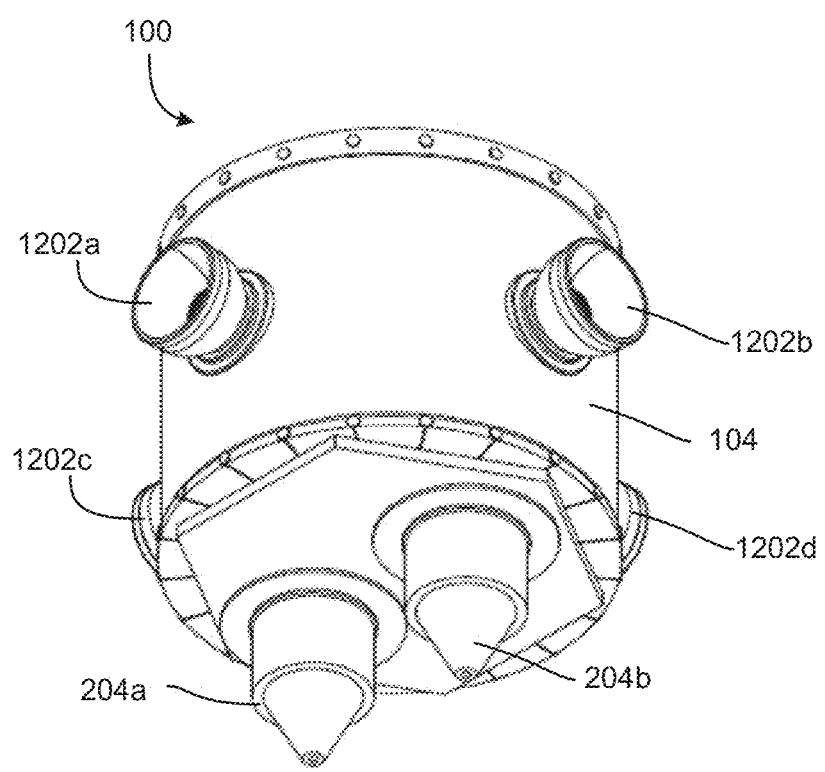
FIG. 16 is a perspective view of an extended structure additive manufacturing device having multiple material bonding components, according to an aspect of the present disclosure.

Referring now to FIG. 16, a perspective view of extended structure additive manufacturing device 100 having multiple material bonding components 204, according to an aspect of the present disclosure, is shown. Device 100 may include multiple material bonding components 204. Such bonding components 204 may connected to frame 104, connected to the same or multiple traverses 206, connected to portions of movement mechanism 106 connected for movement to manipulator arms, or have other connections apparent to those skilled in the relevant art(s) after reading the description herein. Material bonding components 204 may each bond different types of materials and/or bond material via different mechanisms (e.g., fused deposition modeling, welding, and the like). Device may include multiple movement devices including thrusters 1202, arms 1502 (not shown in FIG. 16, and the like. Bonding components 204 may create structures and portions thereof using the same materials or different types of materials.

Figure 17:
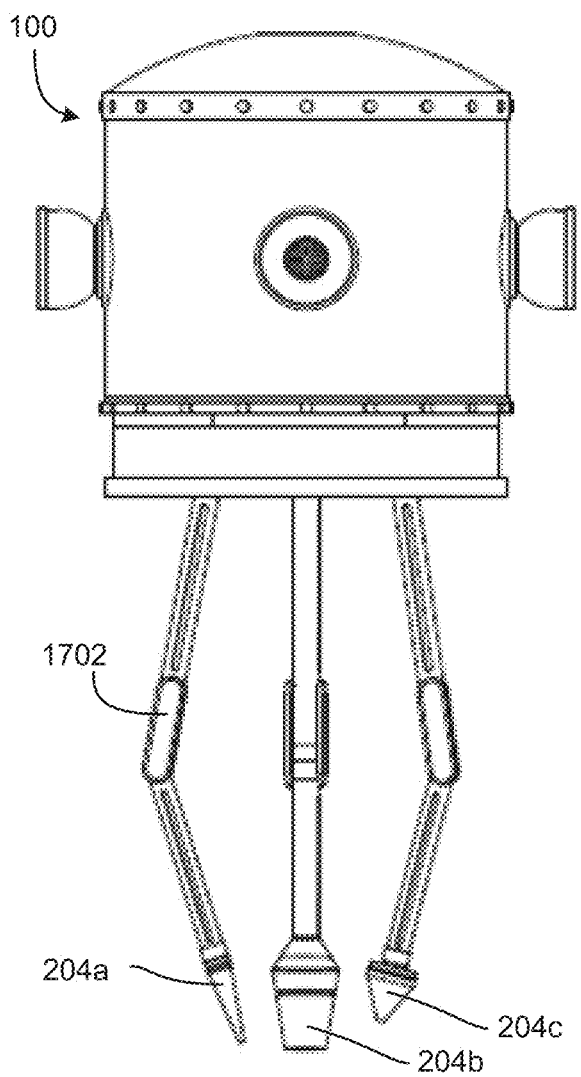
FIG. 17 is a side view of an extended structure additive manufacturing device having additional arms, each arm including an additional bonding component, according to an aspect of the present disclosure.

Referring now to FIG. 17, a perspective view of extended structure additive manufacturing device 100 having additional arms 1702, each arm including an additional bonding component 204, according to an aspect of the present disclosure, is shown. Device 100 may include multiple bonding components 204 configured for different materials, construction resolutions, and the like. For example, device 100 may include one bonding component 204a which produces high-resolution parts via extrusion of a thermoplastic and a second bonding component 204b which produces lower resolution parts via extrusion. In some aspects, arm 1702 comprise all or a portion of positioning system 206.

Figure 18:
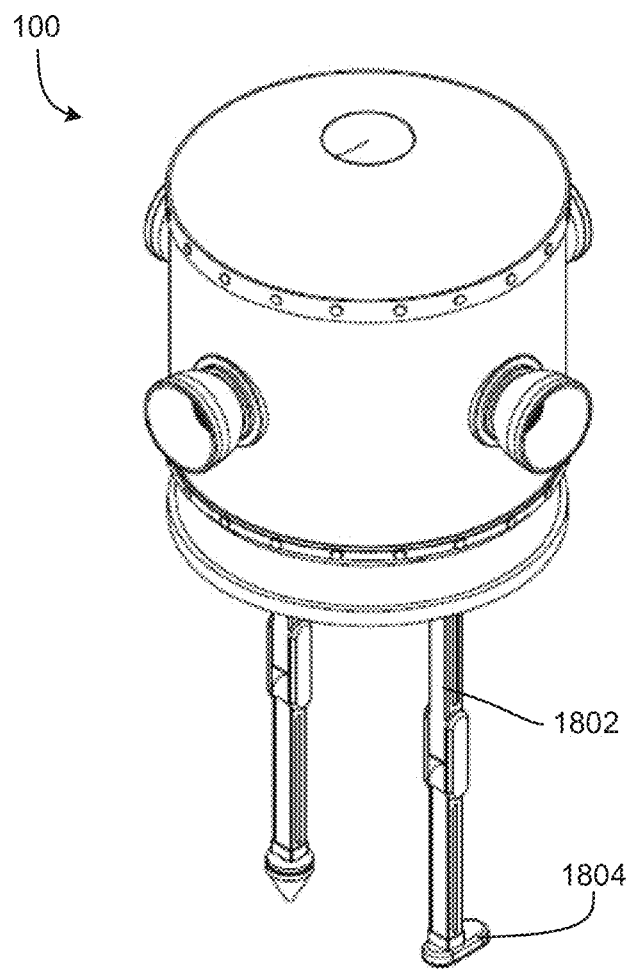
FIG. 18 is a perspective view of an extended structure additive manufacturing device having an articulating arm including a scanning device, according to an aspect of the present disclosure.

Referring now to FIG. 18, a perspective view of extended structure additive manufacturing device 100 having an articulating arm 1802 including an accessory 1804, namely a scanning device, according to an aspect of the present disclosure, is shown.

Device 100 may include one or more arms 1802 having accessories 1804. For example, accessory 1804 may be a scanner (as shown in FIG. 18), a camera, or other detection device. Accessory 1804 may also be a manipulator arm, claw or other device as shown in, for example, FIG. 15. As will be apparent to those skilled in the relevant art(s) after reading the description herein, accessory 1804 may be any mechanism which facilitates creating part 102, ensuring the quality of part 102, assists in joining part 102 to other objects, and the like.

Figure 19:
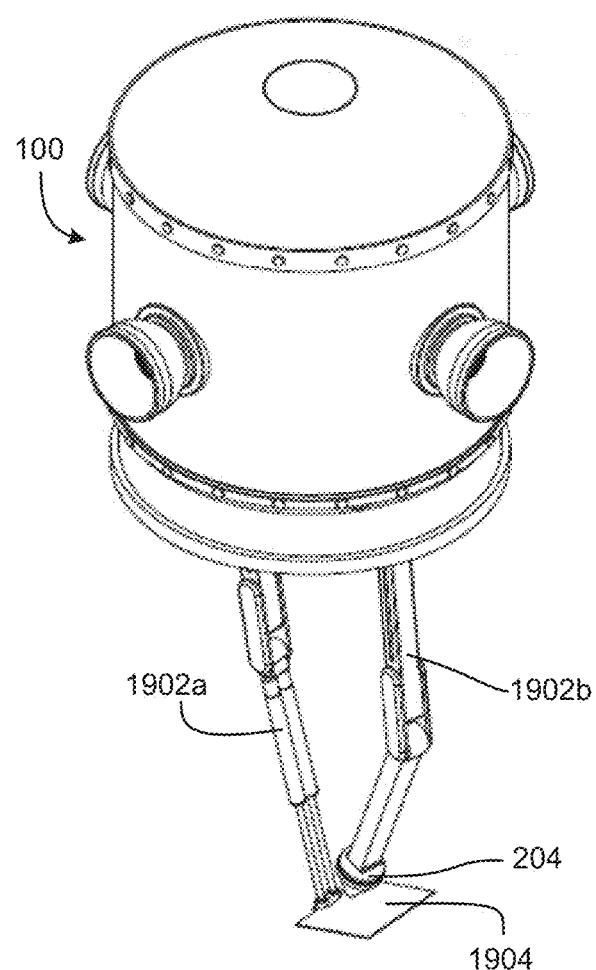
FIG. 19 is a perspective view of extended structure additive manufacturing device including a build tray, according to an aspect of the present disclosure.

Referring now to FIG. 19, a perspective view of extended structure additive manufacturing device 100 including a build tray 1904, according to an aspect of the present disclosure, is shown. Accessory 1804 may be build tray 1904, providing a surface for creating parts 102 and portions thereof.

Figure 20:
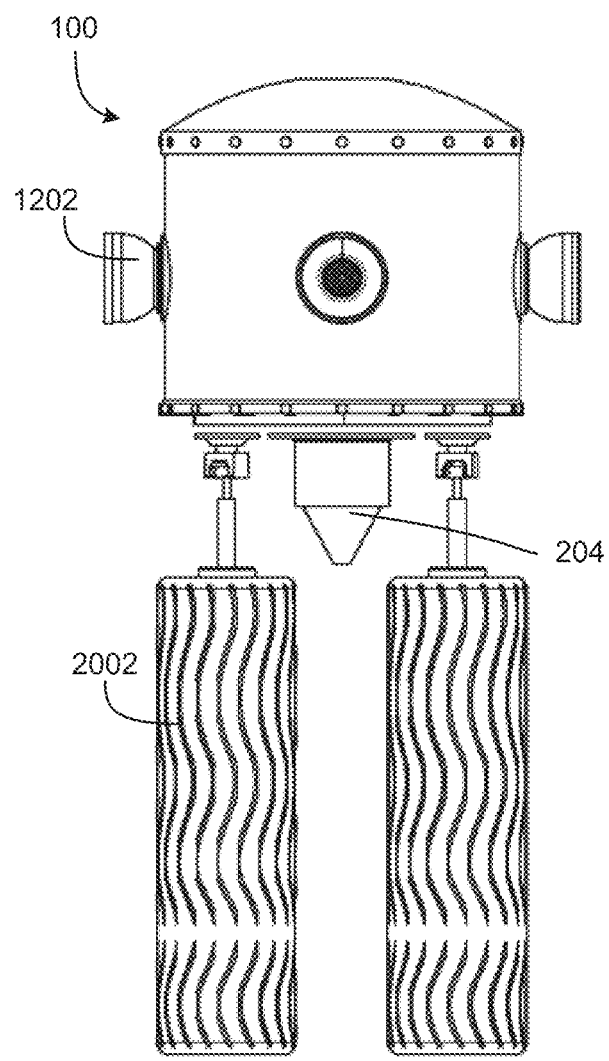
FIG. 20 is a side view of an extended structure additive manufacturing device having extended vertically oriented rollers, according to an aspect of the present disclosure.

Referring now to FIG. 20, a side view of extended structure additive manufacturing device 100 having extended vertically oriented rollers 2002, according to an aspect of the present disclosure, is shown. Roller 2002 facilitate movement of device 100 across structures including part 102 created by bonding component 204. Thrusters 1202 may be utilized to transit device 100 from one portion of part 102 to another or from one area to another.

Figure 21:
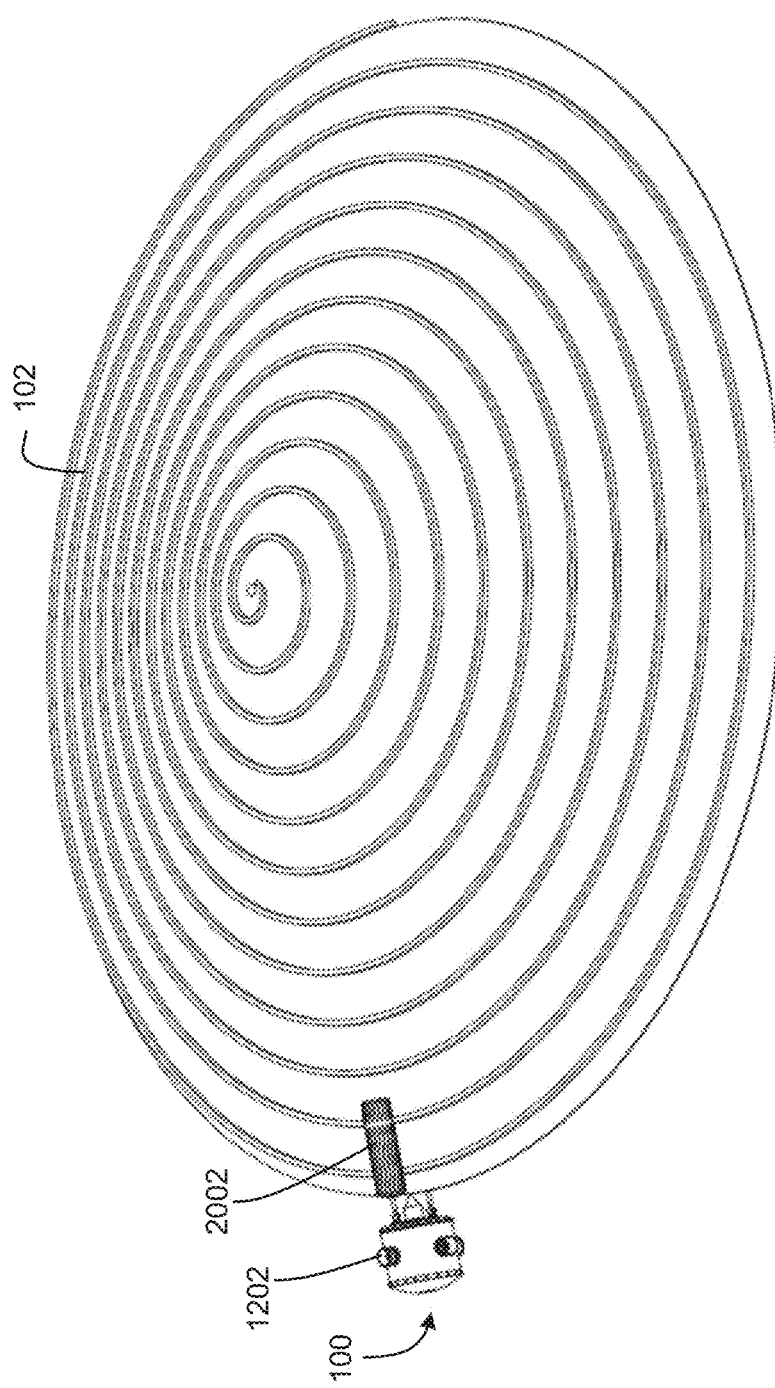
FIG. 21 is a perspective view of an extended structure additive manufacturing device creating a circular dish, according to an aspect of the present disclosure.
Figure 22:
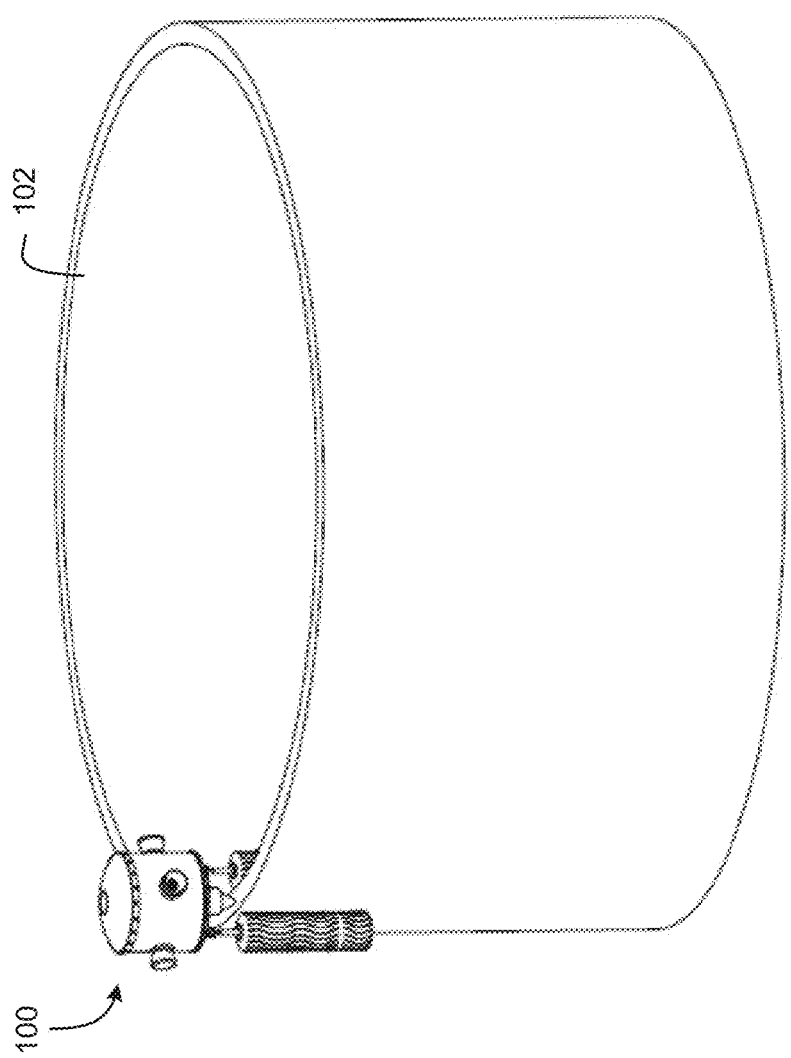
FIG. 22 is a perspective view of an extended structure additive manufacturing device creating a large cylinder, according to an aspect of the present disclosure.
Figure 23:
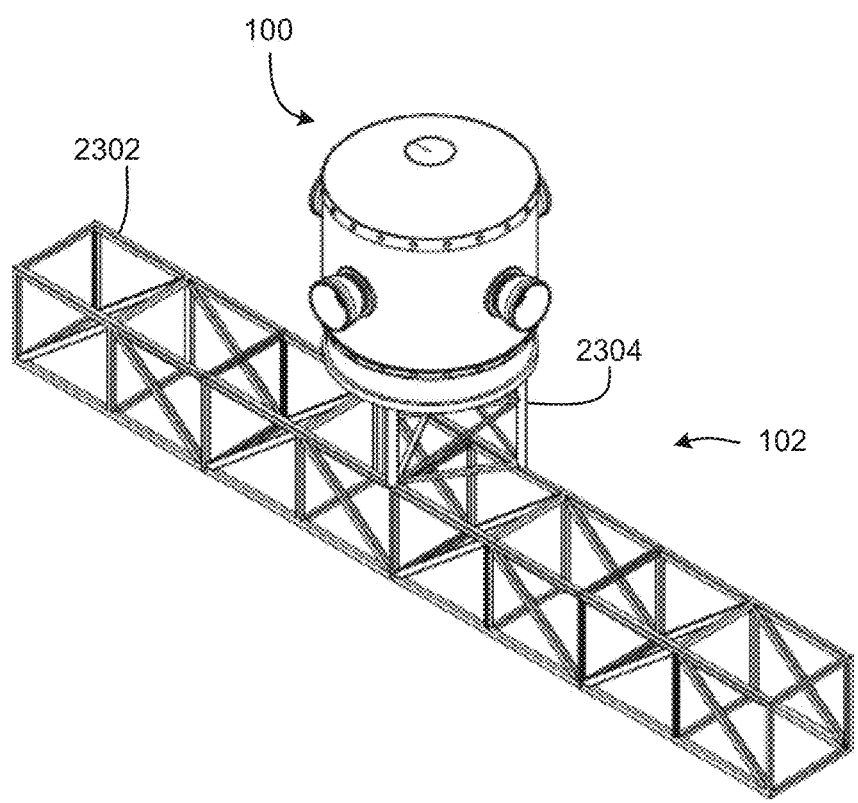
FIG. 23 is a perspective view of an extended structure additive manufacturing device creating a multi-truss structure, according to an aspect of the present disclosure.

Referring now to FIGS. 21-23, a perspective view of extended structure additive manufacturing device 100 creating non-linear structures 102, according to various aspects of the present disclosure, are shown.

Device 100 may create curved structures 102, such as a dish as shown in FIG. 21 or the large cylinder shown in FIG. 22. Various portions of movement mechanism 106 may be utilized to reorient device 100, enabling the creation of non-linear structures. For example, thrusters 1202 and rollers 2002 may be used to reorient and guide device 100 as structure is created. Movement mechanism 206 which positions bonding component 204 may also place bonding component 204 such that a complex structure may be created.

Device 100 may create a first portion of a structure 102, such as a first truss 2302 and then be reoriented and create additional portions of structure 102, such as a second truss 2304 connected to first truss 2302 and extending away from first truss 2302.

Figure 24:
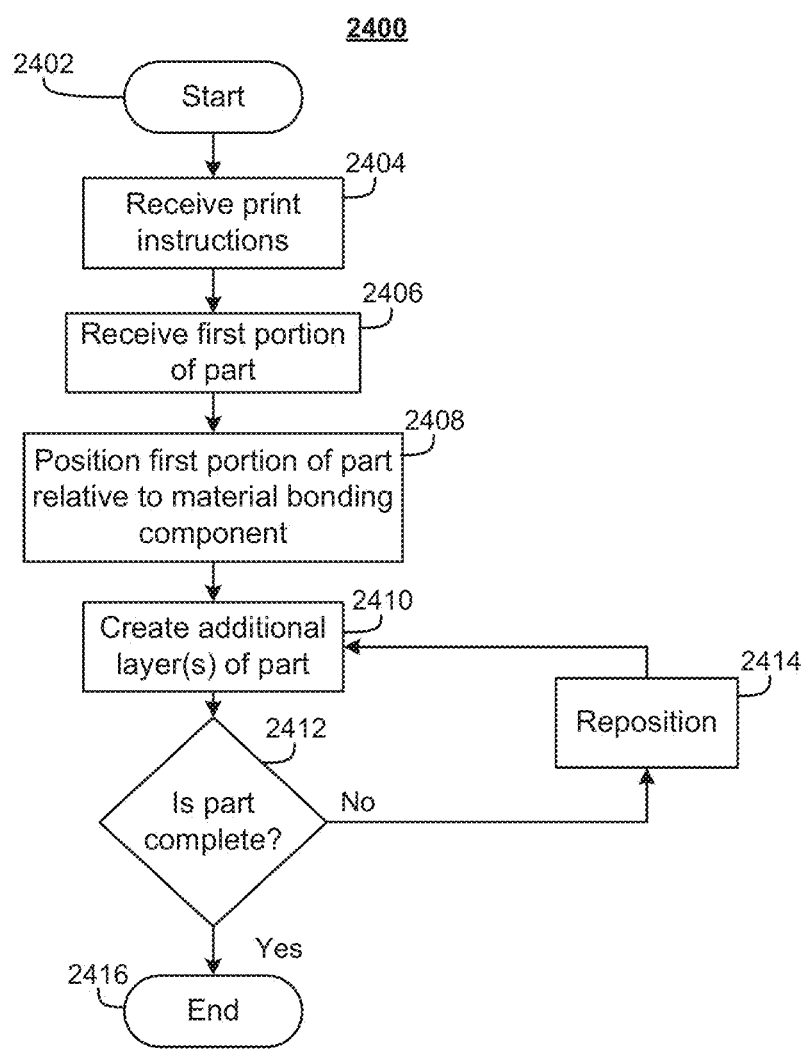
FIG. 24 is a flowchart illustrating an exemplary process for creating a part, namely an extended structure, using an extended structure additive manufacturing device, according to an aspect of the present disclosure.

Referring now to FIG. 24, a flowchart illustrating an exemplary process 2400 for creating part 102 using extended structure additive manufacturing device 100, according to an aspect of the present disclosure, is shown.

Process 2400 begins as step 2402 with control immediately passing to step 2404.

At step 2404, device 100 receives all or a portion of print instructions for part 102. In some aspects, control electronics adds guide topography 402 or other structures to part instructions in order to facilitate part 102 creation by device 100.

In various aspects, device 100 contains print instructions and step 2404 may be omitted.

At step 2406, a first portion of part 102 is received by device 100. The first portion may be produced by another additive manufacturing device, or supplied from another source (e.g., produced by other methods). The first portion serves as a based to create part 102. Other portion may be received and integrated into part 102 during the part creation process. For example, reinforcing rods may be periodically added.

In other aspects, the first portion has been previously created by device 100. For example, a first truss is provided. Process 2400 is utilized to create additional structure connected to the provided first truss.

At step 2408, the first portion of part 102 is positioned within device 100 in order to facilitate creation of part 102.

In various aspects, device 100 creates part 102 without utilizing a first portion provided by another source. Steps 2406 and 2408 may be omitted.

At step 2410, device 100 creates a portion of part 102 such as one or more layers. Where material bonding system 202 includes z-axis movement, multiple layers may be produced.

At step 2412, after device 100 can no longer produce layers of part 102 in the current position relative to part 102, it is determined if part 102 is complete. If part 102 is complete, step 2416 executes, ending process 2400. If part 102 is incomplete, moving mechanism 106 repositions device 100 and/or part 102 to enable creation of additional portions of part 102 by device 100.

In this manner, device 100 may create portions of part 102 as device 100 moves relative to the object or device 100 may create a portion, cease creation, reposition itself relative to part 102 and recommence creating portions of part 102. Device 100 may therefore form very long objects such as beams, pipes, and the like of essentially unlimited length.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An extended structure additive manufacturing device for producing large continuous objects, the extended structure additive manufacturing device comprising:
   a frame having at least one side and an opening from which a part extends from during creation;
   a movable material bonding component connected to the frame, the material bonding component configured to receive portions of a material, the material bonding component configured to create the part from the received material via positioning and bonding each of the portions of the received material at a part creation area; and
   a movement mechanism, comprising at least one arm with a first end attached to the at least one side of the frame and an attachment to the arm attached at a second end of the arm to engage the part, configured to move the extended structure additive manufacturing device relative to the part.

2. The extended structure additive manufacturing device of claim 1, wherein the movement mechanism is configured to move the extended structure additive manufacturing device relative to the part in a movement mechanism movement axis extending away from the part creation area; and
   wherein the movement mechanism is connected for movement to the frame outside the part creation area and outside the opening from which the part extends from during part creation.

3. The extended structure additive manufacturing device of claim 2, the attachment to the arm at the second end comprising at least one articulating griping arm.

4. The extended structure additive manufacturing device of claim 2, the attachment to the arm at the second end comprising at least one powered gear wheel arm, the at least one gear wheel arm comprising an articulating arm and a powered toothed wheel positioned at an arm end portion and configured to contact the part.

5. The extended structure additive manufacturing device of claim 2, the movement mechanism comprising at least one multiple roller arm, the at least one roller arm connected for movement to the frame at a first roller arm end portion and connected for movement to a roller at a second roller arm end portion, the roller configured to contact the part, an actuator connected at a first actuator end portion to the frame and connected at a second actuator end portion to the roller arm, the actuator controlling the position of the roller arm.

6. The extended structure additive manufacturing device of claim 2, the movement mechanism comprising at least one tread arm, the at lea tread arm connected for movement to the frame at a first tread arm end portion and connected for movement to a tread assembly at a second tread arm end portion, the tread assembly comprising a folding frame having two powered treads, the folding frame configured to contact each of the two powered treads with the part via folding.

7. The extended structure additive manufacturing device of claim 2, the movement mechanism comprising at least one powered worm gear arm, the at least one worm gear arm comprising a vertically oriented powered worm gear configured to contact the part.

8. The extended structure additive manufacturing device of claim 2, the movement mechanism comprising multiple thrusters positioned on the frame, the thrusters controlled by a position control module to provide for movement of the extended structure additive manufacturing device along the part being created.

9. The extended structure additive manufacturing device of claim 8, the movement mechanism further comprising multiple articulating griping arms.

10. The extended structure additive manufacturing device of claim 1, wherein the material bonding component is a filament extruder.

11. The extended structure additive manufacturing device of claim 1, further comprising:
a feedstock source comprising the material.

12. The extended structure additive manufacturing device of claim 1, wherein the part is created from metal material.

13. The extended structure additive manufacturing device of claim 1, wherein the part is created from multiple materials.

14. The extended structure additive manufacturing device of claim 13, further comprising a second movable material bonding component connected for movement to the frame, the second material bonding component configured to receive portions of a second material, the second material bonding component configured to create portions of the part from the received second material via positioning and bonding each of the portions of the received second material at the part creation area.

15. The extended structure additive manufacturing device of claim 1, further comprising a material bonding component positioning system connected to the frame and connected for movement to the material bonding component, the material bonding component positioning system configured to move the material bonding component in three axes.

16. The extended structure additive manufacturing device of claim 15, wherein the material bonding component positioning system is configured to move the material bonding component in a step-wise fashion in a vertical positioning axis, the vertical positioning axis parallel to a movement mechanism movement axis, the movement mechanism configured to move in a step-wise fashion in the movement mechanism movement axis; and
wherein a material bonding component positioning system vertical positioning axis minimum step size is substantially smaller than a movement mechanism movement axis minimum step size.

17. The extended structure additive manufacturing device of claim 16, wherein the material bonding component positioning system vertical positioning axis minimum step size is approximately equal to a part layer size.

18. The extended structure additive manufacturing device of claim 1, further comprising control electronics to create guide topography in a created part, the guide topography contacts the movement mechanism during part creation and stabilize the relative position of the part and the extended structure additive manufacturing device.

19. The extended structure additive manufacturing device of claim 18, wherein the control electronics further creates the guide topography on the created part to include at least one of:
a column of teeth;
a worm gear;
a plurality of indentations;
roughened surface; and
an adhesive surface.

20. An extended structure additive manufacturing device for producing large continuous objects in outer space, the extended structure additive manufacturing device comprising:
a frame comprising at least one side and an opening from which a part extends from during creation;
a movable material bonding component connected for movement to the frame, the material bonding component configured to receive portions of a material, the material bonding component configured to create a continuous, space-based part from the received material via positioning and bonding each of the portions of the received material;
a movement mechanism configured to move the extended structure additive manufacturing device relative to the part, the movement mechanism comprising at least one arm with a first end attached to the at least one side of the frame and an attachment to the arm attached at a second end of the arm to engage the part; and
control electronics to create a guide topography on a manufactured part configured to contact the movement mechanism during part creation and stabilize the relative position of the part and the extended structure additive manufacturing device.

21. The extended structure additive manufacturing device of claim 20, wherein guide topography includes at least one of: a column of teeth; a worm gear; a plurality of indentations; roughened surface; and an adhesive surface.

22. The extended structure additive manufacturing device of claim 20, wherein part creation instructions are provided to the control electronics to provide for guide topography.

23. The extended structure additive manufacturing device of claim 22, wherein the control electronics add guide topography after receiving an initial part design file at the extended structure additive manufacturing device.

24. The extended structure additive manufacturing device of claim 1, wherein a combination of the frame, the movable material bonding component and the movement mechanism are arranged to create the part while at least one of free floating and free falling in at least one of an outer space environment, a microgravity environment, a free fall environment, a nautical environment, and a variable force environment.

25. The extended structure additive manufacturing device of claim 20, wherein a combination of the frame, the movable material bonding component and the movement mechanism are arranged to produce the large continuous objects in outer space while free floating in at least one of an outer space environment and a microgravity environment.

26. The extended structure additive manufacturing device of claim 1, wherein the second end of the arm to engage the part comprises at least one of electrostatic adhesion elements, a vacuum element and a section element to provide for the arm to engage and disengage from the large continuous object be produced to move the extended structure additive manufacturing device relative to the part.

27. The extended structure additive manufacturing device of claim 1, wherein the second end of the arm to engage the part comprises at least one of electrostatic adhesion elements, a vacuum element and a section element to provide for the arm to engage and disengage from the large continuous object be produced to move the extended structure additive manufacturing device relative to the part.

* * * * *